(12) United States Patent
Smith et al.

(10) Patent No.: US 10,919,161 B2
(45) Date of Patent: Feb. 16, 2021

(54) CLUTCHED JOINT MODULES FOR A ROBOTIC SYSTEM

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 165 days.

(21) Appl. No.: 15/810,101

(22) Filed: Nov. 12, 2017

(65) Prior Publication Data

US 2018/0133905 A1 May 17, 2018

Related U.S. Application Data

(60) Provisional application No. 62/421,175, filed on Nov. 11, 2016.

(51) Int. Cl.
*B25J 17/02* (2006.01)
*B25J 19/00* (2006.01)
(Continued)

(52) U.S. Cl.
CPC ......... *B25J 19/0041* (2013.01); *B25J 9/0006* (2013.01); *B25J 17/0241* (2013.01);
(Continued)

(58) Field of Classification Search
CPC .. B25J 19/0041; B25J 9/0006; B25J 17/0241; F16D 27/14; F16D 23/12
(Continued)

(56) References Cited

U.S. PATENT DOCUMENTS 1,880,138 A 9/1932 Franz
2,850,189 A 9/1958 Leroy
(Continued)

FOREIGN PATENT DOCUMENTS

CN 101214653 A 7/2008
CN 103610524 A 3/2014
(Continued)

OTHER PUBLICATIONS

Aghili et al., Sensing the torque in a robot's joints, www.memagazine.org/backissues/september98/features/torque/torque,html, 1998, pp. 1-9, The American Society of Mechanical Engineers.
(Continued)

*Primary Examiner* — Randell J Krug

(57) ABSTRACT

A clutched joint module comprising an output member and an input member rotatable relative to each other about an axis of rotation; a primary actuator operable to apply a primary torque to rotate the output member about the axis of rotation; and a clutch mechanism operable between an engaged state and a disengaged state to facilitate application of the primary torque. The clutch mechanism can comprise a plurality of plates and an actuator operable to compress the plurality of plates to cause the clutch mechanism to function in the engaged state. The actuator can be a ball-ramp clutch device. A quasi-passive elastic actuator can be coupled to the input member and can be operable, via the clutch mechanism, to release stored energy to apply an augmented torque to assist rotation of the output member. Associated methods and systems are disclosed.

41 Claims, 22 Drawing Sheets

(51) Int. Cl.
  *B25J 9/00* (2006.01)
  *F16D 28/00* (2006.01)
  *F16D 25/04* (2006.01)
  *F16D 13/52* (2006.01)
  *F16D 23/12* (2006.01)
  *F16D 25/0638* (2006.01)
  *F16D 48/02* (2006.01)
  *F16H 1/28* (2006.01)

(52) U.S. Cl.
  CPC ............. *F16D 13/52* (2013.01); *F16D 23/12* (2013.01); *F16D 25/048* (2013.01); *F16D 25/0638* (2013.01); *F16D 25/14* (2013.01); *F16D 28/00* (2013.01); *F16D 2023/123* (2013.01); *F16H 1/28* (2013.01)

(58) Field of Classification Search
  USPC ..... 74/661, 665 A, 490.05; 310/101; 184/45
  See application file for complete search history.

(56) References Cited

U.S. PATENT DOCUMENTS

| | | |
|---|---|---|
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |
| 3,759,563 A | 9/1973 | Kitamura |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,398,110 A * | 8/1983 | Flinchbaugh ......... B25J 9/1025 310/83 |
| 4,483,407 A | 11/1984 | Iwamoto et al. |
| 4,567,417 A | 1/1986 | Francois et al. |
| 4,575,297 A | 3/1986 | Richter |
| 4,591,944 A | 5/1986 | Gravel |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 7,168,748 B2 | 1/2007 | Townsend et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,132,835 B2 | 3/2012 | Ban et al. |
| 8,151,401 B2 | 4/2012 | Cheyne |
| 8,182,010 B2 | 5/2012 | Lee et al. |
| 8,245,728 B2 | 8/2012 | Jacobsen et al. |
| 8,295,975 B2 | 10/2012 | Arimatsu et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |

(56) References Cited

U.S. PATENT DOCUMENTS

| | | |
|---|---|---|
| 8,888,864 B2 | 11/2014 | Iverson et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 * | 5/2016 | Herr .................. A61F 2/60 |
| 9,533,411 B2 | 1/2017 | Jacobsen et al. |
| 9,616,580 B2 | 4/2017 | Smith et al. |
| 9,643,323 B2 | 5/2017 | Nagatsuka et al. |
| 9,727,076 B2 | 8/2017 | Smith et al. |
| 9,789,603 B2 | 10/2017 | Jacobsen et al. |
| 1,002,884 A1 | 7/2018 | Cheng et al. |
| 10,216,177 B2 | 2/2019 | Gildert et al. |
| 10,406,676 B2 | 9/2019 | Smith et al. |
| 10,512,583 B2 | 12/2019 | Smith |
| 10,533,542 B2 | 1/2020 | Smith et al. |
| 10,566,914 B2 | 2/2020 | Fujita et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 * | 11/2013 | Herr .................. A61H 3/00 601/34 |
| 2013/0302129 A1 | 11/2013 | Smith et al. |
| 2013/0331744 A1 | 12/2013 | Kamon |
| 2013/0333368 A1 | 12/2013 | Durfee et al. |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 * | 6/2015 | Kazerooni ............ A61F 5/0125 602/16 |
| 2015/0209214 A1 | 7/2015 | Herr et al. |
| 2015/0272749 A1 | 10/2015 | Amend, Jr. et al. |
| 2015/0278263 A1 | 10/2015 | Bowles et al. |
| 2015/0321342 A1 | 11/2015 | Smith et al. |
| 2016/0114482 A1 | 4/2016 | Lessing et al. |
| 2016/0153508 A1 * | 6/2016 | Battlogg ................ G05G 5/03 74/553 |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2018/0193999 A1 | 7/2018 | Jacobsen et al. |
| 2018/0290309 A1 | 10/2018 | Becker et al. |
| 2018/0298976 A1 * | 10/2018 | Battlogg .................. F16F 9/12 |
| 2019/0176320 A1 | 6/2019 | Smith et al. |
| 2019/0184576 A1 | 6/2019 | Smith et al. |

FOREIGN PATENT DOCUMENTS

| | | |
|---|---|---|
| CN | 203495949 U | 3/2014 |
| CN | 203752160 U | 8/2014 |
| CN | 104843484 A | 8/2015 |
| CN | 105818143 A | 8/2016 |
| CN | 107471203 A | 12/2017 |
| CN | 108081303 A | 5/2018 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2942162 A2 | 11/2015 |
| EP | 2168548 B1 | 10/2016 |

(56) References Cited

FOREIGN PATENT DOCUMENTS

| | | |
|---|---|---|
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | S56-140510 A | 11/1981 |
| JP | S58-113586 A | 7/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H03-85398 U | 8/1991 |
| JP | H04-44296 U | 4/1992 |
| JP | H05-004177 A | 1/1993 |
| JP | H05-023989 A | 2/1993 |
| JP | H06-213266 A | 8/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H1156931 | 3/1999 |
| JP | H11-130279 A | 5/1999 |
| JP | 2002-161547 A | 6/2002 |
| JP | 2003-103480 A | 4/2003 |
| JP | 2004-105261 A | 4/2004 |
| JP | 2005-118938 A | 5/2005 |
| JP | 2005-237504 A | 9/2005 |
| JP | 2005-334999 A | 12/2005 |
| JP | 2006-016916 A | 1/2006 |
| JP | 2006007337 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-220496 A | 10/2013 |
| JP | 2013-248699 A | 12/2013 |
| JP | 2014-054273 A | 3/2014 |
| JP | 2014-073222 A | 4/2014 |
| JP | 2014200853 A | 10/2014 |
| JP | 2015112649 A | 6/2015 |
| JP | 2015-212010 A | 11/2015 |
| JP | 2015-214019 A | 12/2015 |
| JP | 2016-539017 A | 12/2016 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| WO | WO 2003/002309 A1 | 1/2003 |
| WO | WO 2003/081762 A1 | 10/2003 |
| WO | WO 2007/144629 A2 | 12/2007 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |

OTHER PUBLICATIONS

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.

Amikabir University of Technology, Manipulator Dynamics (Power Point), Computer Engineering and Information Technology Department, to the best of applicant's knowledge article was available before the application filing date, 44 pages.

Barras, Stabilization of a Biped Robot with its arms—A Practical Approach, http://biorob.epfl.ch/files/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Phsychological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

(56) References Cited

OTHER PUBLICATIONS

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers for Use in Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City; Michigan.

Jacobsen et al., Research Robots for Application in A1, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.

Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.

Magnetic Base, www.ask.com/wiki/magnetic_base; page last updated Sep. 12, 2012, 2 pages, retrieved from www.ask.com/wiki/magnetic_base.

Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.

Mirfakhrai et al., Polymer artificial muscles, materialstoday, Apr. 2007, pp. 30-38, vol. 10 No. 4, Elsevier, Netherlands.

Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.

Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.

Newport Corporation, Heavy-Duty Magnetic Base, 300 lb (1334 N) Holding Force, ¼-20 Thread, http://search.newport.com/?q=*&x2=sku&q2=200, as accessed Apr. 23, 2011, 1 page, Irvine, CA.

Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.

Omega, Load Cell Designs, www.omega.com/literature/transactions/volume3/load3.html, Nov. 1, 2005, 3 pages.

Ostling, Wearable Robots, Technology Review, Jul./Aug. 2004, pp. 70-73, Elizabeth Bramson-Boudreau, Cambridge, Massachusetts.

Pan, Improved Design of a Three-degree of Freedom Hip Exoskeleton Based on Biomimetic Parallel Structure, Jul. 2011, 132 pages, University of Ontario Institute of Technology, Canada.

Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.

Pelrine et al., High-field deformation of elastomeric dielectrics for actuators, Materials Science and Engineering, Nov. 28, 2000, pp. 89-100, vol. 11 Issue 2, Elsevier, Netherlands.

Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.

Pin, Wearable Robotics Presented to New Horizons in Science Briefing, Oct. 2003, 34 pages, Knoxville, Tennessee.

Pratt et al., The RoboKnee: An Exoskeleton for Enhancing Strength and Endurance During Walking, International Conference on Robotics & Automation, Apr. 2004, 6 pages, IEEE, New Orleans, LA.

Robotics Research Group, Degrees of Freedom, www.robotics.utexas.edu/rrg/learn_more/low_ed/dof/, Oct. 25, 2006, 2 pages, University of Texas.

Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.

Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, California.

Shamaei et al., Estimation of Quasi-Stiffness of the Human Knee in the Stance Phase of Walking, Mar. 22, 2013, 10 pages, vol. 8 Issue 3. PLOS One, San Francisco, California.

Siddharth et al., Design and Analysis of a 1-DOF Walking Mechanism, http://siddarthswaminathan.in/files/WalkingMechanism.pdf, Nov. 2012, 7 pages, India.

Smith et al., Integrated thin-film piezoelectric traveling wave ultrasonic motors, Sensors and Actuators A: Physical, Dec. 2012, pp. 305-311, vol. 188, Elsevier, Netherlands.

Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.

Suitx, Phoenix Medical Exoskeleton, https://www.suitx.com/phoenix-medical-exoskeleton, 3 pages, to the best of the applicant's knowledge article was available before the application filed, US Bionics, Inc., Berkeley, California.

Suleiman, Engineering an affordable exoskeleton, Phys.org, https://phys.org/news/2014-06-exoskeleton/html, Jun. 12, 2014, 5 pages, Science X Network.

Tmsuk, Rescue Robot "T-53" release Control Technologies to Control the Synchronous Operation of the Arm, http://robot.watch.

(56) References Cited

OTHER PUBLICATIONS impress.co.jp/cda/news/2007/07/18/564.html, as accessed Sep. 1, 2011 5 pages, Robot Watch website.

Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton for Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the $10^{th}$ International Workshop on Robot Motion and Control, Jul. 6-8, 2015, 6 pages, IEEE, Poland.

International Search Report for International Application No. PCT/US2019/069001 dated Apr. 30, 2020, 18 pages.

International Search Report for International Application No. PCT/US2019/068998 dated May 20, 2020, 15 pages.

International Search Report for International Application No. PCT/US2019/069004 dated Apr. 1, 2020, 15 pages.

\* cited by examiner

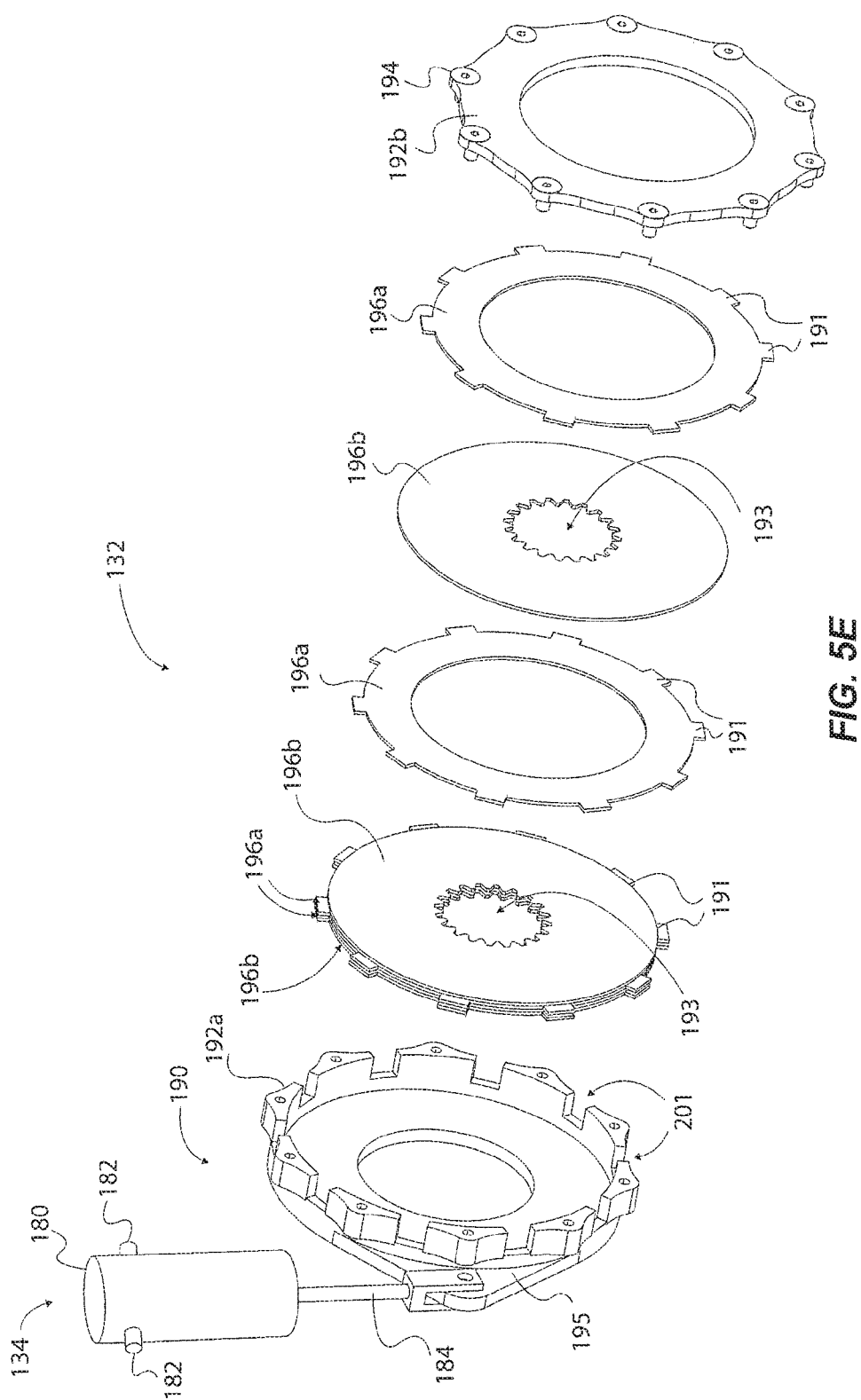

CLUTCHED JOINT MODULES FOR A ROBOTIC SYSTEM

RELATED APPLICATIONS

This application claims the benefit of U.S. Provisional Application No. 62/421,175, filed Nov. 11, 2016, which is incorporated by reference herein in its entirety.

BACKGROUND

A wide variety of exoskeleton, humanoid, robotic arms, and other robots and robotic systems exist, many of which seek the most efficient operation possible. One fundamental technical problem that continues to be a focus is how such systems, such as where energetic autonomy is concerned, can minimize power consumption while still providing acceptable levels of force output. Indeed, power remains an inevitable challenge in the world of robotics. Designers of such systems typically attempt to optimize operation based on the intended use or application. In many cases, either power or efficiency is sacrificed, at least to some extent. For instance, some robotic systems employ high-output power systems that can meet the force output demands of the robotic system, putting this ahead of any efficiency considerations. On the other hand, some robotic systems employ more efficient power systems in an attempt to improve efficiency, with force output being a secondary consideration. High output force or power systems, while capable of performing various tasks, can be costly. Moreover, such systems often are tethered to a power source as portable power remains limited in its capabilities. Efficient, yet low force output systems can lack practicality, inasmuch as many robotic systems are designed to assist humans in work related or other tasks that require a certain level of force in order to perform the task(s). Overall, the power issue has been a challenging obstacle with various efforts being made to maximize output while minimizing power consumption. Even small advances in this ratio of power to output energy consumption area can be highly beneficial. While much research and development is ongoing to improve power sources, another way robotic systems can improve the power to energy output ratio is through the structural build of the robotic system, namely the way various components are configured, how these are controlled, and if the systems can take advantage of naturally occurring phenomenon, such as gravity.

BRIEF SUMMARY OF THE INVENTION

An initial summary of the disclosed technology is provided here. Specific technology examples are described in further detail below. This initial summary is intended to set forth examples and aid readers in understanding the technology more quickly, but is not intended to identify key features or essential features of the technology nor is it intended to limit the scope of the claimed subject matter.

The present disclosure sets forth a clutched joint module for use within a robotic assembly, comprising an output member operable to couple to a first support member of a robotic system; an input member operable to couple to a second support member of the robotic system; a primary actuator operable to apply a torque to rotate the output member about an axis of rotation; and a clutch mechanism operably coupled between the input member and the output member, the clutch mechanism operable in an engaged state, a semi-engaged state, or a disengaged state, wherein the engaged state and the semi-engaged state facilitate selective, variable application of the primary torque to the output member.

The clutch mechanism can be operable in the engaged or semi-engaged state to generate a braking force for restricting rotation between the input and output members either with or without the primary torque.

The clutch mechanism can comprise a plurality of plates and an actuator operable to compress the plurality of plates to cause the clutch mechanism to function in the engaged state or the semi-engaged state.

The clutch mechanism can comprise a clutch axis of rotation substantially collinear with the axis of rotation.

The primary actuator can comprise a motor and a transmission operatively coupled between the motor and the output member. The clutch mechanism, the motor, and the transmission can be arranged along and operable about the axis of rotation. The transmission can be at least partially disposed within a central void of the motor, wherein the motor can comprise a brushless frameless electric motor.

A quasi-passive elastic actuator can be coupled to the input member and arranged in parallel with the primary actuator, the quasi-passive elastic actuator being operable to store and release energy upon the clutch mechanism being engaged or semi-engaged. The quasi-passive elastic actuator can operate to generate a braking force to at least partially restrict rotation between the input and output members. The quasi-passive elastic actuator can also operate to apply an augmented torque to be combined with a primary torque generated by the primary actuator to assist in rotation of the output member. The quasi-passive elastic actuator can comprise a quasi-passive linear pneumatic actuator, wherein the quasi-passive linear pneumatic actuator is gas pressure charged to at least partially define a joint stiffness value of the clutched joint module. The quasi-passive elastic actuator can be selectively switchable in real-time between an elastic state, a semi-elastic state, and an inelastic state via the clutch mechanism.

The clutch mechanism can comprise a clutch housing coupled to the input member; a plurality of input plates retained by the clutch housing; a plurality of output plates rotatably supported by the clutch housing and rotatably engaged with the plurality of input plates; and an actuator operable to apply a compression force to the output plates and the input plates, upon receiving the clutch control signal, to cause the clutch mechanism to operate in the engaged state. The output member can be coupled to the plurality of output plates, such that, when the clutch mechanism is in the disengaged state, the output plates freely rotate relative to the input plates.

The primary actuator can comprise a motor, and the clutched joint module can further comprise a first transmission disposed at least partially within the motor and a second transmission operatively coupled between the first transmission and the clutch mechanism.

The clutch mechanism can alternatively comprise a clutch housing coupled to the input member; a plurality of input plates retained by the clutch housing; a plurality of output plates rotatably supported by the clutch housing and rotatably engaged with the plurality of input plates; a ball-ramp clutch device coupled to the clutch housing; and an actuator coupled to the ball-ramp clutch device and operable to rotate the ball-ramp clutch device, upon receiving a control signal, to apply a compression force to the output plates and the input plates to cause the clutched mechanism to operate in the engaged state. The clutch mechanism can further comprise an output shaft coupled to the plurality of output plates, such that, when the clutch mechanism is in the disengaged state, the output plates freely rotate relative to the input plates. The primary actuator can comprise a motor, and wherein the clutched joint module further comprises a first transmission disposed at least partially within the motor, and a second transmission operatively coupled between the first transmission and the clutch mechanism.

The present disclosure further sets forth a robotic system comprising a robotic limb having at least one rotatable joint, the robotic assembly comprising a plurality of support members; and a plurality of clutched joint modules defining respective joints of the robotic limb, each clutched joint module rotatably coupling together at least two of the plurality of support members, and comprising: a joint rotatable about an axis of rotation and defining a degree of freedom; a primary actuator operable to apply a primary torque to rotate the joint; and a clutch mechanism coupled to the primary actuator and operable between an engaged state, a semi-engaged state and a disengaged state, wherein the engaged state and the semi-engaged state facilitate selective application of the primary torque to rotate the joint.

The clutch mechanism can be operable in the engaged or semi-engaged state to generate a braking force for restricting rotation of the joint either with or without the primary torque, wherein the primary actuator comprises a motor and a transmission operatively coupled to the motor. The clutch mechanism, the motor, and the transmission can be arranged along and operable about the axis of rotation.

The clutched joint module can further comprise a quasi-passive elastic actuator operable with the clutch mechanism and arranged in parallel with the primary actuator, the quasi-passive elastic actuator being operable to store and release energy upon the clutch mechanism being engaged or semi-engaged.

The quasi-passive elastic actuator can operate to generate a braking force to at least partially restrict rotation between the input and output members.

The quasi-passive elastic actuator can also operate to apply an augmented torque to be combined with a primary torque generated by the primary actuator to assist in rotation of the joint.

One of the plurality of clutched joint modules can comprise a quasi-passive elastic actuator comprising an elastic element of a first type, and another one of the plurality of clutched joint modules can comprise a quasi-passive elastic actuator comprising an elastic element of a different type.

The quasi-passive elastic actuator can be selectively switchable in real-time between an elastic state, a semi-elastic state, and an inelastic state via the clutch mechanism.

The present disclosure further sets forth a method for operating a robotic joint of a robotic system, the method comprising operating a clutch mechanism of a clutched joint module defining a joint of the robotic system between an engaged state, a semi-engaged state, and a disengaged state, wherein the clutch mechanism is operably coupled between input and output members of the clutched joint module; and rotating a first support member of the robotic system coupled to the output member relative to a second support member coupled to the input member, thus rotating the joint about an axis of rotation.

Rotating the first support member relative to the second support member can comprise actuating a primary actuator of the clutched joint module with the clutched mechanism in the engaged or semi-engaged state to apply a primary torque to the output member, wherein the clutched mechanism functions to transfer at least a portion of the primary torque from the primary actuator to the output member and rotate the joint.

Rotating the first support member relative to the second support member can comprise passively rotating these with the clutched mechanism in the engaged or semi-engaged state in response to an external force, thereby generating a braking force operable to resist rotation of the joint.

The method can further comprise operating the clutch mechanism in the disengaged state, wherein the joint enters a free swing mode.

The method an further comprise operating a quasi-passive elastic actuator of the clutched joint module in an elastic state or semi-elastic state by selectively engaging the clutch mechanism to generate and apply an augmented torque to the output member.

The method can further comprise operating a quasi-passive elastic actuator of the clutched joint module in an elastic state or semi-elastic state by selectively engaging the clutch mechanism to generate a braking force within the clutched joint module.

The method can further comprise operating a quasi-passive elastic actuator of the clutched joint module in an inelastic state to cause the clutched joint module to enter a free swing mode.

The method can further comprise pre-charging the quasi-passive elastic actuator to a predetermined stiffness.

The present disclosure further sets forth a clutched joint module for use within a robotic assembly, comprising an output member operable to couple to a first support member of a robotic system; an input member operable to couple to a second support member of the robotic system; a primary actuator operable to apply a primary torque to the output member to rotate the first and second support members relative to one another about an axis of rotation of the clutched joint module; a quasi-passive elastic actuator coupled to the input member and operable to apply an augmented torque to the output member that combines with the primary torque applied by the primary actuator to rotate the output member about the axis of rotation; and a clutch mechanism operably coupled to the primary actuator and the quasi-passive elastic actuator, the clutch mechanism operable in an engaged state, a semi-engaged state, or a disengaged state, wherein, in the engaged state, the clutch mechanism operates to place the quasi-passive elastic actuator in an elastic state, and to facilitate application of the augmented torque.

The clutch mechanism and the primary actuator can each have a central axis of rotation substantially parallel to each other.

The quasi-passive elastic actuator can comprise a linear pneumatic actuator, wherein the elastic component further comprises a piston rod and a piston cylinder moveable in a linear motion within a housing, the piston cylinder defining, at least in part, a compression chamber and an expansion chamber.

The linear pneumatic actuator can comprise the input member, wherein the piston rod can be pivotally coupled to a housing of the clutch mechanism at an off-center position, such that, upon the first rotation, movement of the input member causes the piston cylinder to move to compress gas in the compression chamber to selectively store energy.

The primary actuator and the output member can be operatively coupled to each other by a transmission.

Upon the second rotation, the linear pneumatic actuator can release energy via the piston rod to apply the augmented torque to the output member in parallel with the primary torque applied by the primary actuator.

The primary actuator can comprise a motor and a transmission rotatably coupled to the motor, and wherein the drive transmission is at least partially disposed within a central void of the motor.

The clutch mechanism can comprise a clutch housing coupled to the input member; a plurality of input plates retained by the clutch housing; a plurality of output plates rotatably supported by the clutch housing and rotatably engaged with the plurality of input plates; and an actuator operable to apply a compression force to the output plates and the input plates, upon receiving the clutch control signal, to cause the clutch mechanism to operate in the engaged state.

The output member can be coupled to the plurality of output plates, such that when the clutch mechanism is in the disengaged state, the output plates freely rotate relative to the input plates.

Alternatively, the clutch mechanism can comprise a clutch housing coupled to the input member; a plurality of input plates retained by the clutch housing; a plurality of output plates rotatably supported by the clutch housing and rotatably engaged with the plurality of input plates; a ball-ramp clutch device coupled to the clutch housing; and an actuator coupled to the ball-ramp clutch device and operable to rotate the ball-ramp clutch device, upon receiving a control signal, to apply a compression force to the output plates and the input plates to cause the clutched mechanism to operate in the engaged state.

The clutch mechanism can further comprise an output shaft coupled to the plurality of output plates, such that, when the clutch mechanism is in the disengaged state, the output plates freely rotate relative to the input plates, the output shaft being coupled to the output member.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 5E is an exploded view of the clutch mechanism of the clutched joint module of FIG. 5A;

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Figure 1:
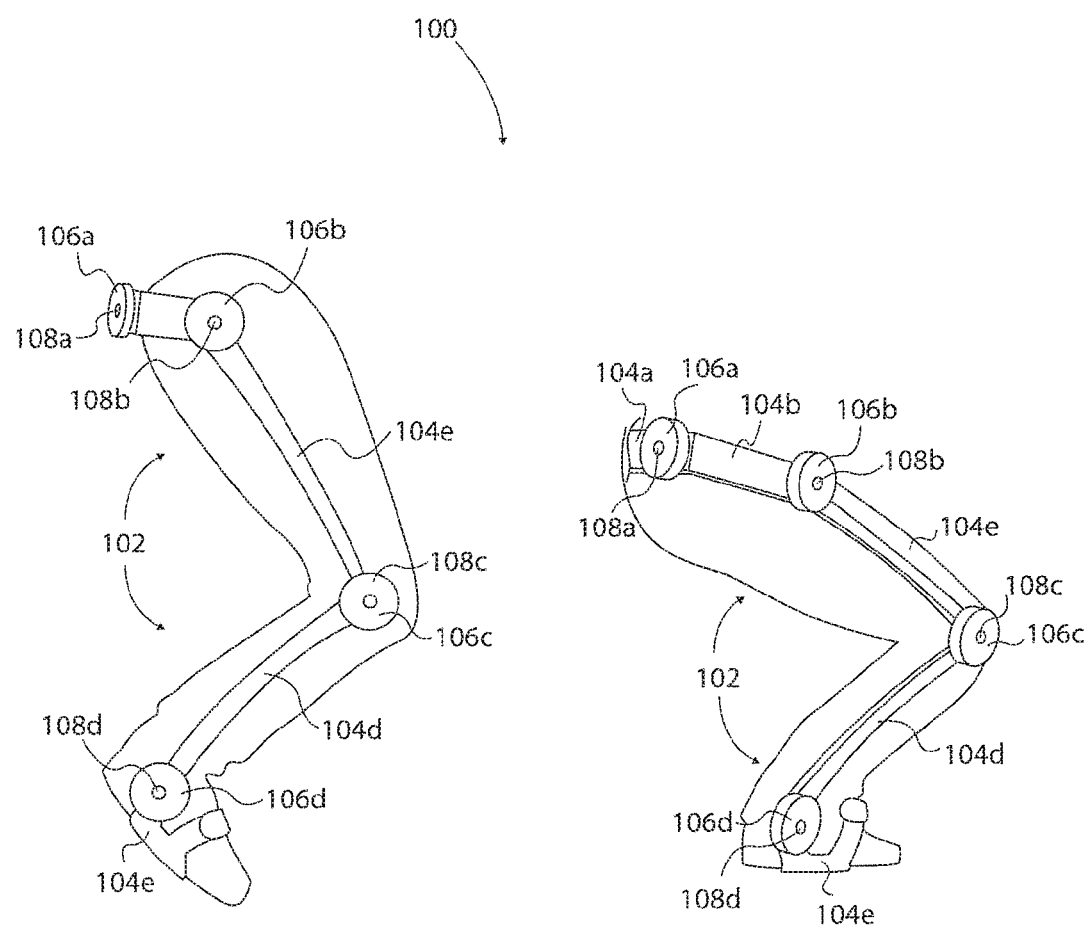
FIG. 1 illustrates two positions of a robotic assembly in the form of a lower exoskeleton having at least one clutched joint module in accordance with an example of the present disclosure.

One example of a robotic assembly 100 is generically illustrated in FIG. 1. The robotic assembly 100 is shown in the form of an exoskeleton, and particularly a lower exoskeleton wearable by a user about the lower body. However, this is not intended to be limiting in any way as the concepts discussed herein can be applicable to and incorporated into or implemented with various types of robotic devices, such as exoskeletons (both upper and lower exoskeletons), humanoid robots or robotic devices, teleoperated robots or robotic devices, robotic arms, unmanned ground robots or robotic devices, master/slave robots or robotic devices (including those operable with or within a virtual environment), and any other types as will be apparent to those skilled in the art.

Figure 4A:
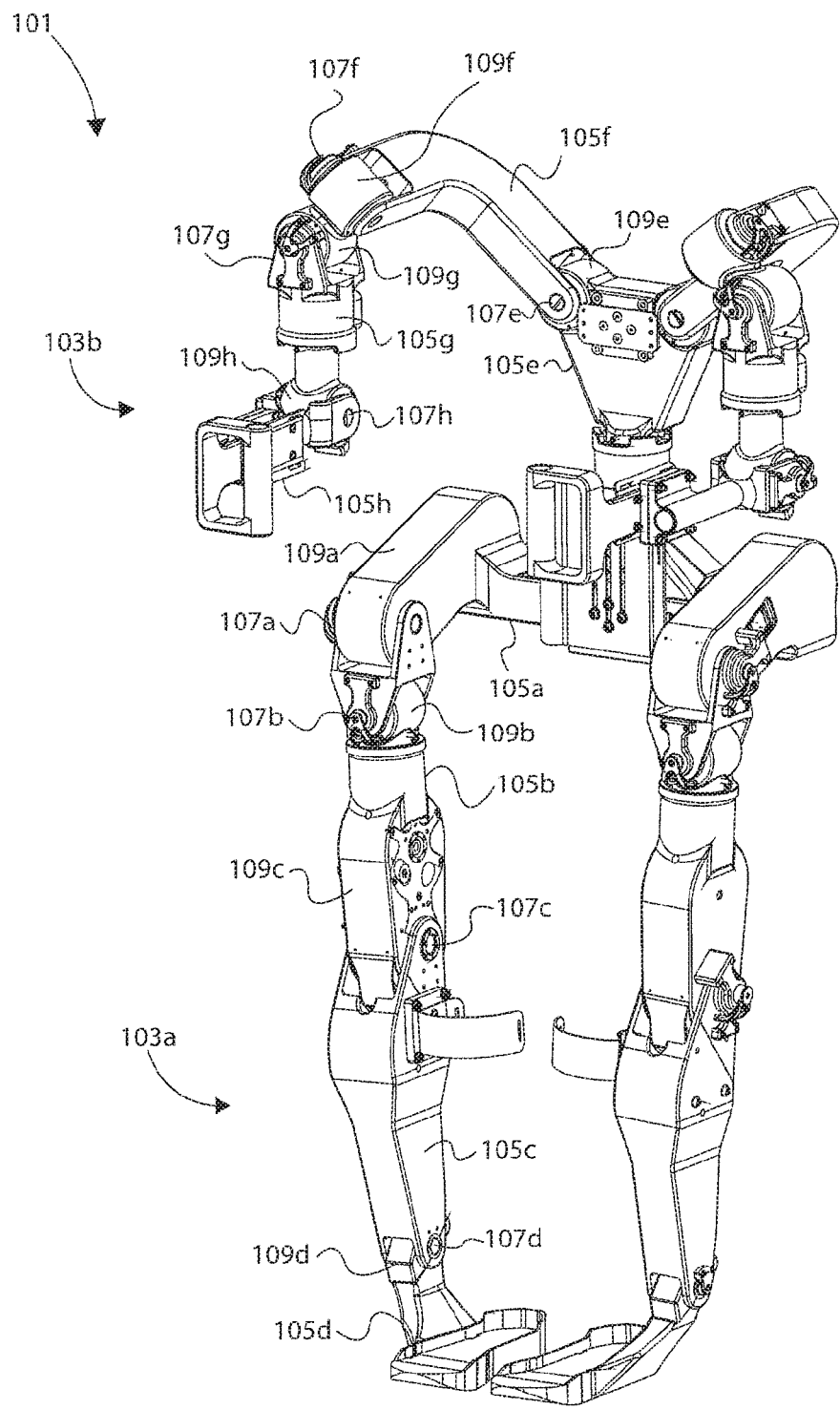
FIG. 4A is an isometric view of a robotic assembly, namely a wearable robotic exoskeleton, having at least one clutched joint module in accordance with an example of the present disclosure.

In the example of the robotic assembly 100, the exoskeleton as disclosed herein can be configured as a full-body exoskeleton (i.e., similar to the exoskeleton having both a lower body portion and upper body portion, see FIG. 4A), or as only a lower body exoskeleton (i.e., some or all of the lower body portion), or as only an upper body exoskeleton (i.e., some or all of the upper body portion).

In some examples, the robotic assembly 100 can comprise left and right exoskeleton limbs. Note that only the right exoskeleton limb 102 is shown in FIG. 1, but it should be appreciated that the principles discussed can relate to joint modules of any exoskeleton limb of an upper body or lower body exoskeleton. The right exoskeleton limb 102 can comprise a plurality of lower body support members 104a-d. The support members 104a-d can be coupled together for relative movement about a plurality of clutched joint modules 106a-d defining a plurality of degrees of freedom about respective axes of rotation 108a-d. The rotational degrees of freedom about the axes of rotation 108a-d can correspond to one or more degrees of freedom of the human leg. For example, the rotational degrees of freedom about the axes 108a-d can correspond, respectively, to hip abduction/adduction, hip flexion/extension, knee flexion/extension, and ankle flexion/extension, respectively. Similarly, although not shown, rotational degrees of freedom about respective axes of rotation within an upper body exoskeleton can correspond to one or more degrees of freedom of a human arm. For example, the degrees of freedom about the axes of rotation can correspond to shoulder abduction/adduction, shoulder flexion/extension, shoulder medial/lateral rotation, elbow flexion/extension, wrist pronation/supination, and wrist flexion/extension. A degree of freedom corresponding to wrist abduction/adduction can also be included, as desired.

A human user or operator may use or interact with the exoskeleton robotic assembly 100 (or 101 of FIG. 4A) interfacing with the robotic assembly 100. This can be accomplished in a variety of ways as is known in the art. For example, an operator may interface with the robotic assembly 100 by placing his or her foot into a foot portion of the assembly, where the foot of the operator can be in contact with a corresponding force sensor. Portions of the human operator can also be in contact with force sensors of the exoskeleton robotic assembly 100 located at various locations of the robotic assembly 100. For example, a hip portion of the robotic assembly 100 can have one or more force sensors configured to interact with the operator's hip. The operator can be coupled to the robotic assembly 100 by a waist strap, shoulder strap or other appropriate coupling device. The operator can be further coupled to the robotic assembly 100 by a foot strap and/or a handle for the operator to grasp. In one aspect, a force sensor can be located about a hip, knee or ankle portion of the robotic assembly 100, corresponding to respective parts of the operator. While reference is made to sensors disposed at specific locations on or about the robotic assembly 100, it should be understood that position or force sensors, or both, can be strategically placed at numerous locations on or about the robotic assembly 100 in order to facilitate proper operation of the robotic assembly 100.

As a general overview, clutched joint modules 106a-d can be associated with various degrees of freedom of the exoskeleton to provide forces or torques to the support members in the respective degrees of freedom. Unlike traditional exoskeleton systems and devices, the robotic assembly 100 can be configured, such that each clutched joint module is configured as either an active actuator, or a quasi-passive actuator, as further discussed below. As a quasi-passive actuator, a particular clutched joint module (106a-d) can be configured to recover energy, which can reduce complexity and power consumption of the robotic assembly 100. For example, the clutched joint module 106c, which defines a degree of freedom corresponding to a degree of freedom of knee flexion/extension, can be configured to recover energy during a first gait movement and then release such energy during a second gait movement to apply an augmented torque to assist a primary actuator providing a primary torque in rotation of the joint about the degree of freedom (and in parallel with the torque applied by the primary actuator of the clutched joint module 106c, as discussed below). The clutched joint module 106c can be selectively controlled, so as to be engaged (i.e., caused to enter an operating state or condition in which the elastic actuator stores and releases energy (an elastic state)) and disengaged from operation (i.e., caused to enter an operating state or condition or configuration where it neither stores nor releases energy (an inelastic state)), such that the joint "freely swings" with negligible resistance to rotate the joint as the operator walks or runs, for instance. By operating in parallel with the primary actuator (e.g., a primary motor operable to actuate the joint), the quasi-passive elastic actuator can provide or apply an augmented torque in parallel with the torque provided by the primary actuator (i.e., a torque that is added to the torque generated by the primary actuator). The quasi-passive elastic actuator can comprise a compact internal valve, such as a two-way valve, that can be controlled and operated to change the modes of the quasi-passive actuator, namely to switch between an elastic state (where the actuator acts as a spring for transient energy storage and recovery), and an inelastic state (where the actuator employs a shunting function that allows the actuator to move freely (i.e., not to store or release energy) (except for friction and movement of fluid through the valve). And, the clutched joint module 106c (as a quasi-passive actuator) can be "tuned" to comprise a desired stiffness, which can also be modified, as further discussed below. Thus, the magnitude of stiffness for a given joint is adjustable for mission specific payloads and terrain-specific gaits while the active valve controls exactly when that stiffness is engaged for energy recovery during the support phase and when it is disengaged during the free swinging phase.

As a quasi-passive actuator, the result is effectively a quasi-passive elastic mechanism that is selectively operable to recover energy (e.g., energy lost during some gait or other motions) to reduce or minimize power consumption required to actuate the joint.

The example elastic actuators described herein can be referred to as quasi-passive elastic actuators as they are operable in active and inactive states or modes of operation (as compared to being entirely passive elastic actuators that are always either storing energy or releasing energy during all rotational movements of a joint, or other movements of a mechanical system). In examples described herein, the passive and inactive modes or states of operation can be selectable or controllable and even dynamically selectable or controllable (e.g., selectable in real-time), as well as repeatedly switched from one state or mode to another state or mode, during operation of the robotic system. Depending upon the configuration of the clutched joint module, example quasi-passive elastic actuators can comprise a first active state (sometimes referred to herein as an "elastic state") in which the quasi-passive elastic actuator can be actuated to store and release energy during various rotations of a joint of the robotic system, a second passive state (sometimes referred to herein as an "inelastic state") in which the quasi-passive elastic actuator can be made inactive, such that energy is neither stored nor released during various rotations of the joint, and in some cases a third semi-active or partially active state (sometimes referred to herein as a "semi-elastic state") in which the quasi-passive elastic actuator can be partially actuated to store and release energy during various rotations of the joint. In some example robotic systems, the quasi-passive elastic actuator can be switchable between the different modes or states of operation as needed or desired depending on, for example, needed or desired tasks and corresponding rotation movements, various torque or load requirements of the one or more joints of the robotic system, or needed or desired braking forces.

When combining a plurality of clutched joint modules within a robotic assembly, such as the lower body exoskeleton shown in FIG. 1 or 4A, for example, a significant amount of energy can be recovered and utilized during movement (via hip, knee, and ankle joints), which can reduce weight, size, complexity, and power consumption of the exoskeleton. The above general overview is explained in more detail below. Moreover, each of the various joint modules in the robotic system or assembly can comprise the same type or a different type of quasi-passive elastic actuators (or in other words the same type of different types of elastic components), thus the robotic assembly can be configured for optimal performance depending upon the particular application or tasks to be carried out. As active actuators (i.e., having no quasi-passive elastic element), a particular clutched joint module can be selectively operable (i.e., via a clutch mechanism) to be engaged as an active actuator to actuate a joint, and also to provide gravity compensation, as further discussed below.

Figure 2A:
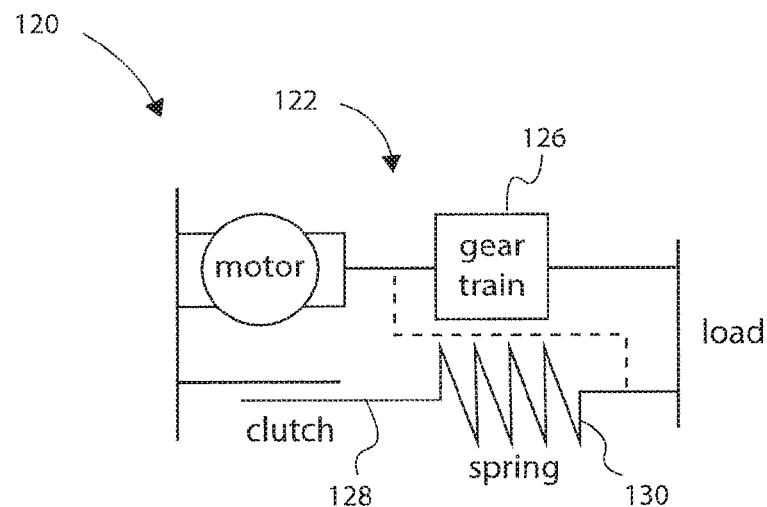
FIG. 2A is a schematic illustration of a clutched joint module in accordance with an example of the present disclosure.
Figure 2B:
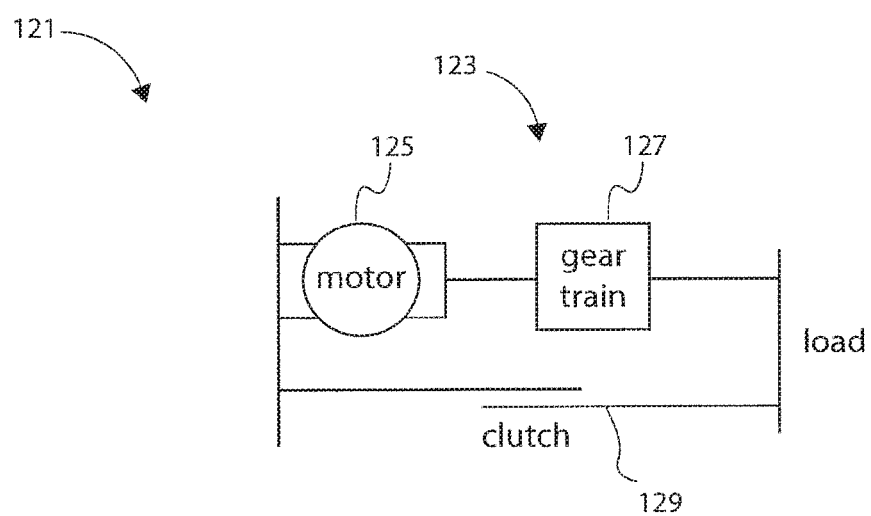
FIG. 2B is a schematic illustration of a clutched joint module in accordance with an example of the present disclosure.

FIGS. 2A and 2B each schematically illustrate clutched actuator joint modules in accordance with two examples of the present disclosure. FIG. 2A shows a clutched actuator joint module 120 having a primary actuator 122 operable to provide a primary torque to the clutched joint module. In one example, the primary actuator can comprise a motor 124 and a transmission or gear train 126 (e.g., a planetary transmission) operating in parallel with a clutch mechanism 128 and an elastic element or spring 128 (e.g., a quasi-passive elastic actuator, such as a rotary or linear pneumatic (air or other gas) type of quasi-passive elastic actuator). The primary actuator 122 is operable to apply a primary torque to a load (e.g., to rotate an output member coupled to a robotic support member) in parallel with an augmented torque selectively applied by the spring (quasi-passive elastic actuator) 128 to rotate a joint of a robotic assembly, as in FIGS. 1 and 4A. The augmented torque is selectively applied by operation of the clutch mechanism 128, which is operable between an engaged state and a disengaged state, as further described below. Note that the gear train 126 can be removed or may not be needed, or a supplemental transmission or gear train can be coupled adjacent the gear train 126 to provide a two-stage transmission from the motor 124 to the load. The examples of FIGS. 5A-6G are schematically represented by FIG. 2A. Further note that the output of the spring 130 can be operatively coupled between the motor 124 and the gear train 126, as illustrated by the dashed lines in FIG. 2A.

FIG. 2B shows a clutched joint module 121 comprising a primary actuator 123 comprising a motor 125 and a transmission or gear train 127 (e.g., a planetary transmission) operating in parallel with a clutch mechanism 129. Here, the clutch mechanism 129 is operable between an engaged state (that facilitates actuation of a primary torque by the primary actuator 123 to the load) and a disengaged state (that allows free swing of an input relative to an output (the load)), as further described below. Note that the gear train 127 can be removed or may not be needed, or a supplemental transmission or gear train can be coupled adjacent the gear train 127 to provide a two-stage transmission from the motor 125 to the load. The examples of FIGS. 5A-6G are each schematically represented by FIG. 2B, but without incorporation of a spring (e.g., removal of the quasi-passive elastic actuator 134, 204).

Figure 3A:
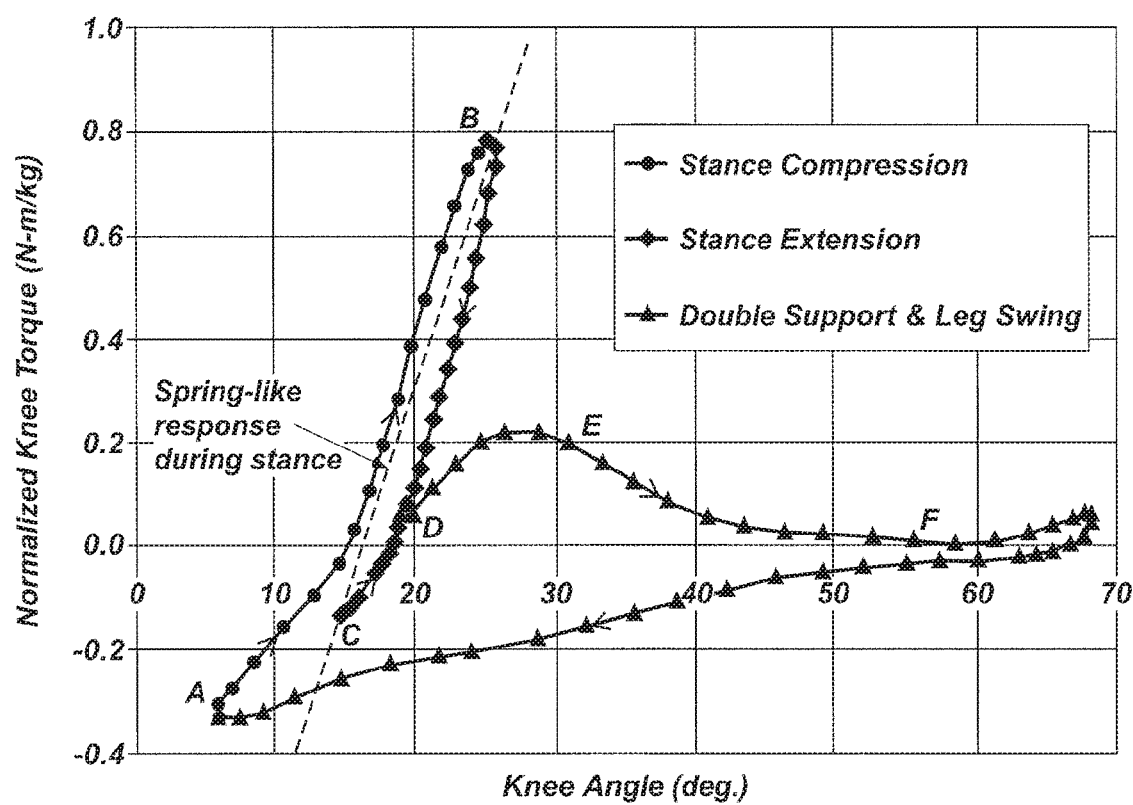
FIG. 3A is a graph illustrating human weight normalized knee joint torque vs. knee joint angle of a human gait cycle.

FIG. 3A is a graph showing joint torque vs. joint position as these occur during an example gait of a human, the graph showing the torque (N-m/kg) occurring in the joint relative to or as corresponding to the angle of rotation of the joint. This particular graph is illustrative of an example torque/angular rotation relationship of a human knee (without wearing an exoskeleton), while walking approximately 3 mph on a flat surface. A first gait movement from point A to point B illustrates stance compression following heel strike, a second gait movement from point B to C illustrates stance extension, with the stance phase being completed at point D. A third gait movement between points D, E, F, and A illustrates "double support and leg swing." Therefore, the "stance phase" is from heel strike (point A) to toe-roll/terminal stance (points A to D), where the torque-joint profile has a quasi-elastic behavior (walking and running are similar regarding this quasi-elastic stiffness). During this phase, the knee also acts as a shock absorber. The "swing phase" is from toe-off to heel strike (points E to A), and during this phase the knee exhibits a quasi-ballistic (passive dynamics) response with some damping during the final extension that occurs before heel strike (thus, the knee acts as a controlled damper or shock absorber).

This characteristic of the human gait is not unique to the knee joint, nor limited to the walking gait, and forms the basis for the clutched joint modules discussed herein. Indeed, when reviewing the joint torque vs. position plots of simulated cyclical exoskeleton activities, such as walking, running, and step climbing, there are periods of time during these specific gait motions where elastic energy recovery can be exploited to reduce the requirement for motor torque to run the joint. Thus, the clutched joint modules described herein can be configured to exploit the features of the natural motion of the hip, knee, and ankle, for instance, to minimize demands on powered actuators (e.g., electric-geared motors) to reduce overall power consumption within the robotics assembly. The clutched joint modules discussed herein can also be incorporated into shoulder and elbow joints, for instance, but these may be more task-specific than as with the lower body joints, as further discussed below. However, the clutched joint modules of lower joints (e.g., hip, knee, ankle) can also be configured to operate based on a specific task (e.g., lifting a load, sitting and standing, and others), rather than just a cyclical operation (e.g., walking or running).

Figure 3B:
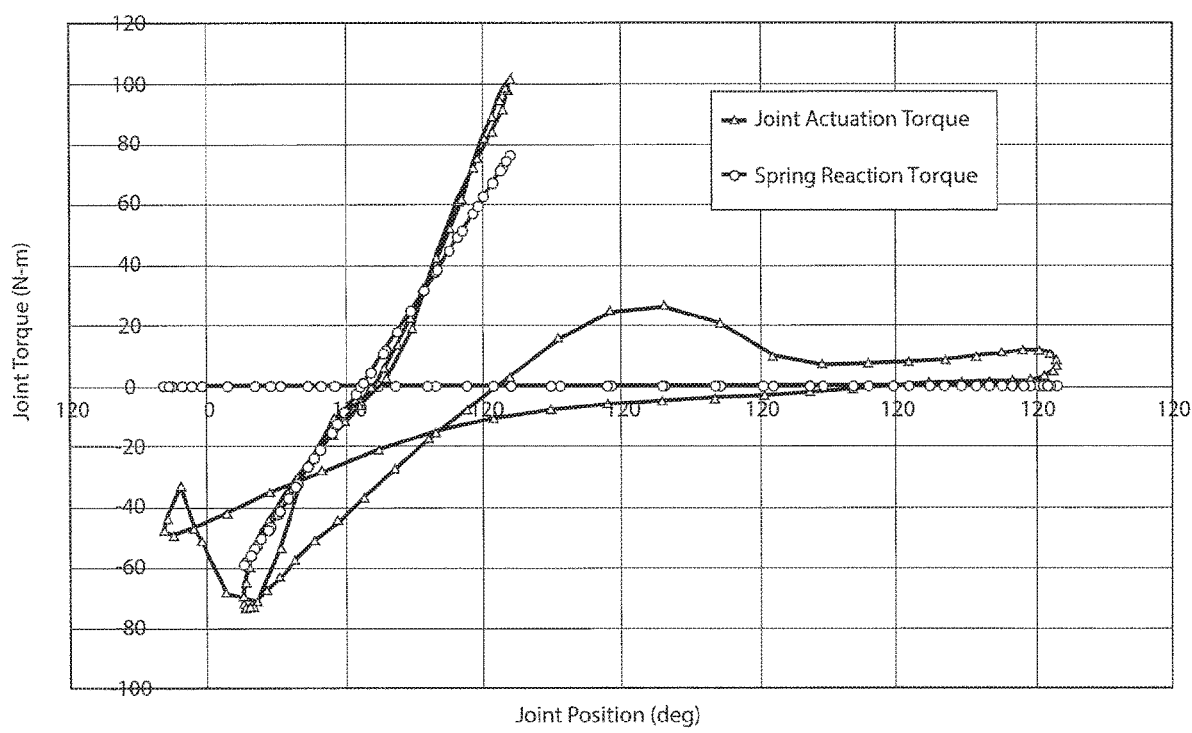
FIG. 3B is a graph illustrating the torque required to accomplish a joint trajectory and a portion of a gait where an elastic response can be created by a clutched joint module.

FIG. 3B is a graph showing a standard exoskeleton knee joint torque (N-m) vs. position (deg.) for walking at 3.5 mph with a 50 lb. payload. The plotted "triangular" labeled line ("joint actuation torque") represents the required overall torque to accomplish the prescribed joint trajectory, while the plotted "circular" labeled lines ("spring reaction torque") represents the part of the gait where an elastic response can by created by a quasi-passive elastic actuator of a clutched joint module. Thus, this spring reaction torque can be exploited to reduce power consumption to actuate a joint, as further detailed below.

Figure 3C:
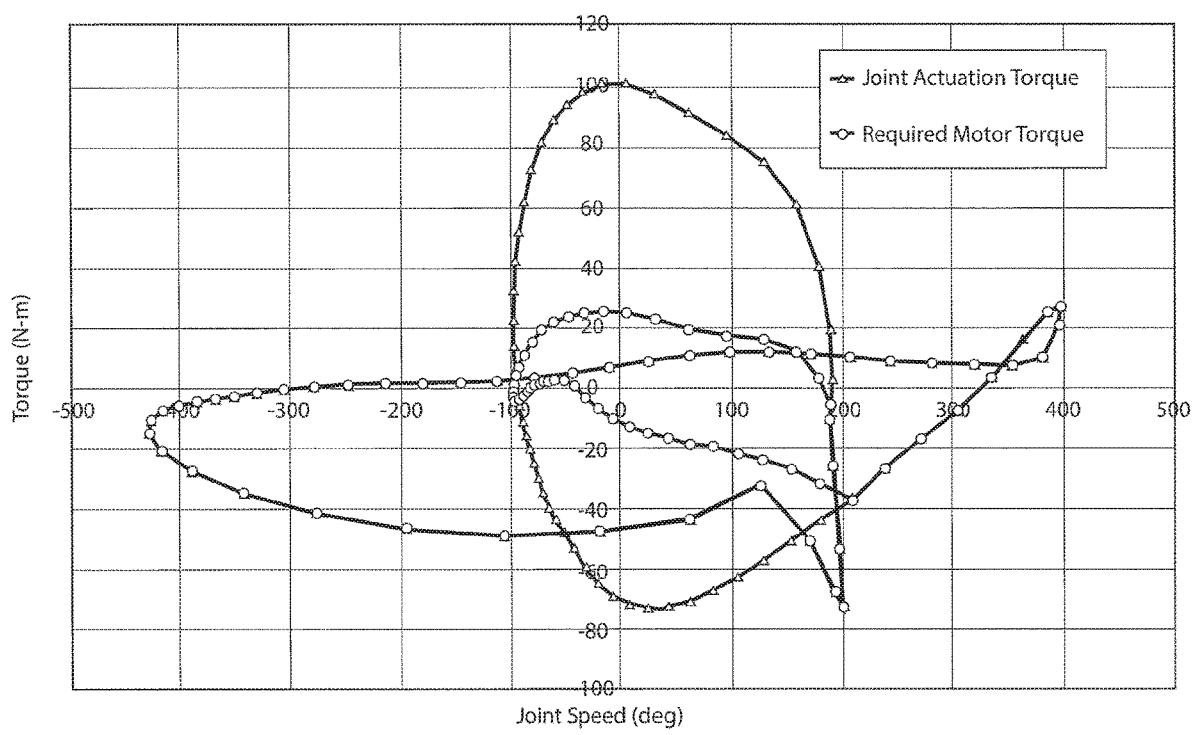
FIG. 3C is a graph illustrating performance of a clutched joint module in accordance with an example of the present disclosure.

FIG. 3C is a graph illustrating performance of an exoskeleton having a clutched joint module with a quasi-passive elastic actuator operating in parallel with a primary actuator, the joint module having a joint stiffness of 7 N-m/degree, associated with the human knee joint, in one example. More specifically, the graph shows joint torque (N-m) vs. joint speed (deg./sec) for walking at 3.5 mph with a 50 lb. payload. The plotted "triangular" labeled line ("joint actuation torque") represents the required overall torque to accomplish the prescribed joint trajectory (e.g., the torque required to rotate a knee), while the plotted "circular" labeled lines ("spring reaction torque") represents the part of the gait where an elastic response can be created by engaging and disengaging the quasi-passive elastic actuator in a timely manner, as exemplified herein.

As illustrated by this "circular" labeled line, the resulting peak torque is substantially reduced (approximately 25 N-m) vs. the normalized torque requirement (approximately 100 N-m) of the "triangular" labeled line. That is, normally (i.e., without incorporating a clutched joint module having an elastic actuator) the torque requirement is peaked at approximately 100 N-m; however, when incorporating a clutched joint module having an elastic actuator as disclosed herein, the resulting peak torque can be only approximately 20 N-m, thus significantly reducing power requirements for the same gait cycle and operating conditions. This is because the clutched joint module stores energy during a first gait movement (via the quasi-passive elastic actuator), and then releases that energy during a second gait movement to apply an augmented torque that can be applied in parallel with a torque applied by a primary actuator (e.g., a geared motor) of the clutched joint module. Of course, other factors play a role in these results, such as weight, payload, etc. In any event, these graphs illustrate that much less on-board power is required by the powered motor to appropriately actuate a joint when used in conjunction with a selectively controllable quasi-passive elastic actuator, as further exemplified below. The use of a parallel elastic actuator effectively reduces the requirement for motor torque as the elastic actuator is engaged and disengaged in a timely manner, such as during specific phases of a gait cycle. Similar plots or graphs can be shown for hip joints, ankle joints, shoulder joints, and elbow joints. In some cases, the elastic actuator can be engaged full-time for the gait cycles of these joints.

Figure 4B:
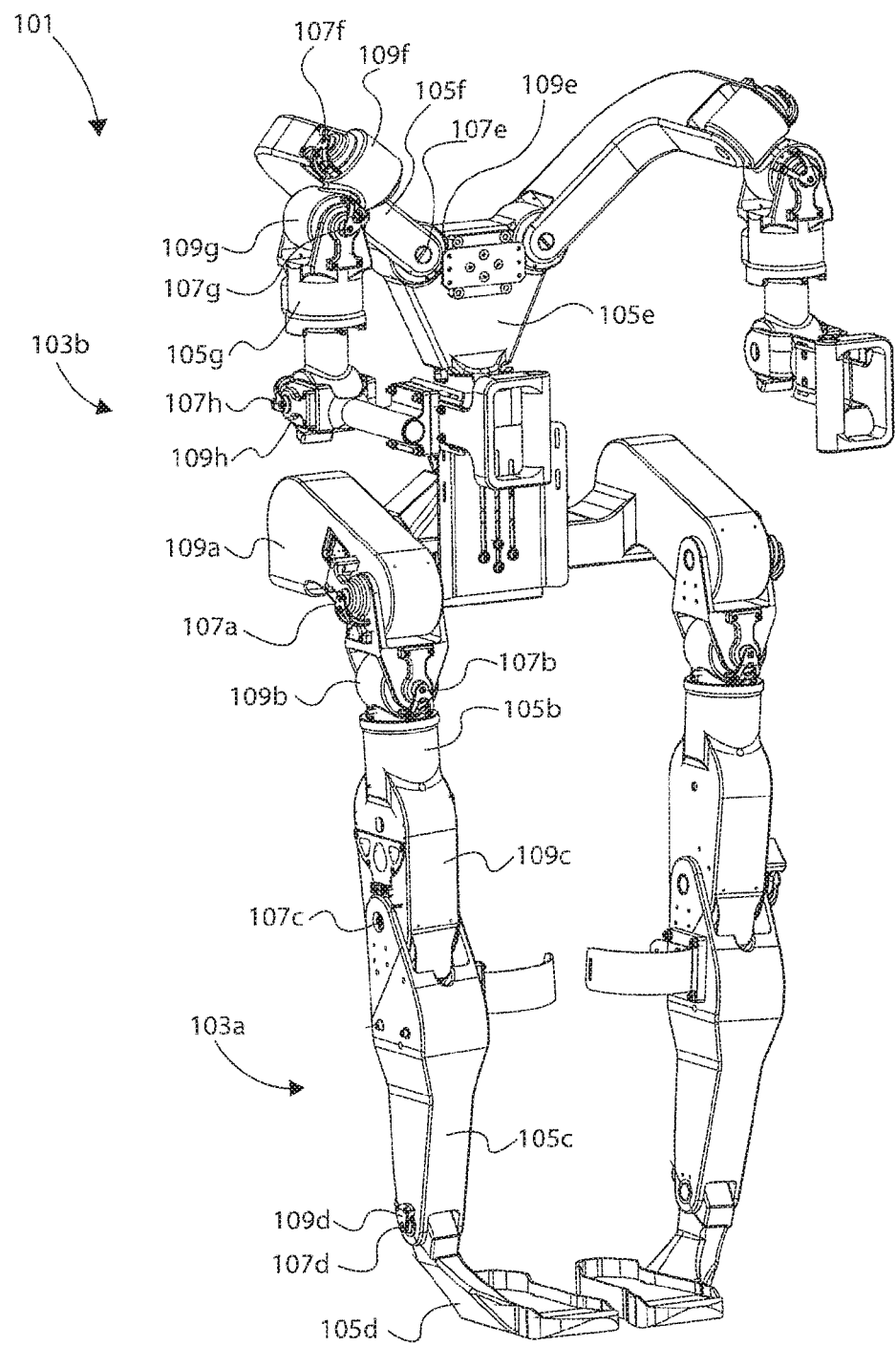
FIG. 4B is an isometric view of the robotic exoskeleton of FIG. 4A.
Figure 4C:
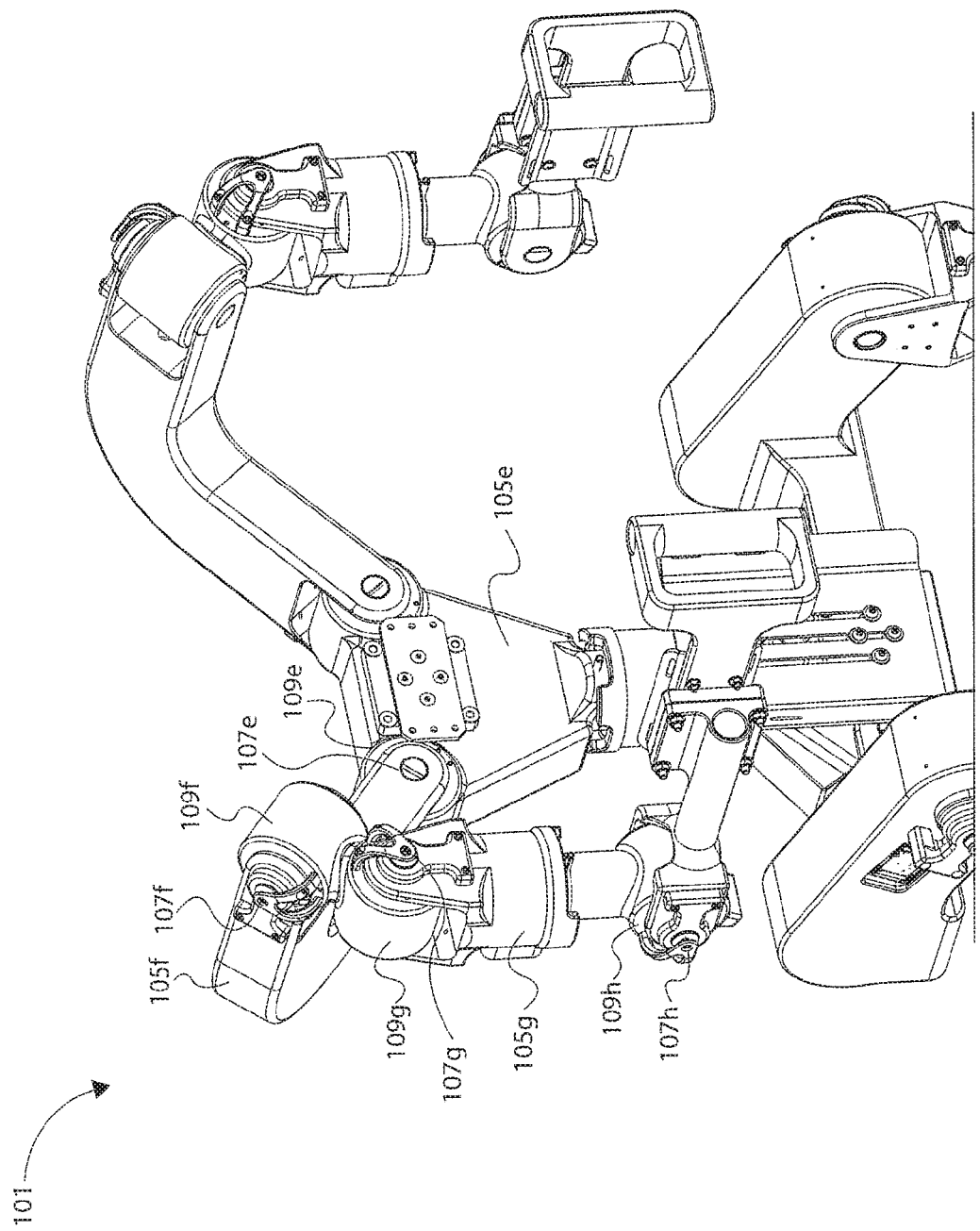
FIG. 4C is a close-up isometric view of the robotic exoskeleton of FIG. 4A.

FIGS. 4A-4C show isometric views of an exemplary robotic assembly 101 in the form of an exoskeleton wearable or usable by a human operator. The robotic assembly 101 could alternatively be a humanoid robot, or other robotic assembly as discussed above. As shown, the robotic assembly 101 can be configured as a full-body exoskeleton (i.e., an exoskeleton having both a lower body portion and an upper body portion). However, this is not intended to be limiting as the exoskeleton can comprise only a lower body exoskeleton (i.e., some or all of the lower body portion), or only an upper body exoskeleton (i.e., some or all of the upper body portion).

The robotic assembly 101 can comprise left and right exoskeleton limbs. The right exoskeleton limb 103 can comprise a plurality of lower body support members 105a-d. The support members 105a-c can be coupled together for relative movement about a plurality of respective joints 107a-c defining a plurality of degrees of freedom about respective axes of rotation. As described in U.S. patent application Ser. No. 15/810,108, filed Nov. 12, 2017, which is incorporated by reference in its entirely herein, the hip joint 107a and knee joint 107c can each comprise a tunable actuator joint module 109a and 109c that can comprise a tunable quasi-passive elastic actuator, as shown in FIGS. 4A and 4B, having a rotary air spring device as an elastic element or component. Alternatively, the hip and knee joints 107a and 107c can each comprise a clutched joint module, such as described by the present disclosure. Joints 107b and joint 107d can also each comprise a clutched joint module 109b and 109d, respectively, as described herein.

Similarly, the right exoskeleton limb 103b can comprise a plurality of upper body support members 105e-h coupled together for relative movement about a plurality of joints 107e-h defining a plurality of degrees of freedom about respective axes of rotation (see FIG. 40 for a closer view). Each joint 107e-h can comprise a clutched joint module 109e-h, respectively, as described herein. Notably, as further described below, each clutched joint module can be provided in a compact form, meaning that the particular axis of rotation of the joint, joint 107e for instance, is substantially collinear with primary components of the clutched joint module 109e, for instance (e.g., primary actuator, transmission(s), clutch mechanism(s), quasi-passive elastic actuator(s)), these being arranged along and configured to be operable about the axis of rotation, as further exemplified below. Thus, each clutched joint module can provide a particular high-torque output in a compact form, such as a clutched joint module that is generally cylindrical and that locates the mass of the module near to the axis of rotation.

FIGS. 5A-5E illustrate a clutched joint module 130 according to an example of the present disclosure, which can be incorporated as, or in other words, can comprise a joint of a robotic assembly (e.g., 100, 101).

The clutched joint module 130 can comprise a primary actuator 132, an optional quasi-passive elastic actuator 134, and a clutch mechanism 136 operatively coupled to each other, with the clutch mechanism 136 and the primary actuator 132 positioned or arranged along and operable about an axis of rotation 140. As further detailed below, an input member 138a and an output member 138b (FIG. 5B) can be directly or indirectly coupled to respective support members of the robotic assembly, which support members are rotatable relative to each other about the axis of rotation 140 of the joint, which corresponds to an axis of rotation of a degree of freedom of a human joint. For instance, the clutched joint module 130 can be incorporated into the robotic assembly 101 as clutched joint module 109f of FIG. 40 that defines, at least in part, the joint 107f comprising a shoulder joint having a flexion/extension degree of freedom. Note that input and output members 138a and 138b are shown as members coupled to their respective components, but they can take many different forms and configurations of suitable input and output members or components that are coupleable to robotic support members, for instance.

The primary actuator 132 can comprise a motor 133 and, optionally, a transmission, such as a first planetary transmission 148 and, further optionally, a second transmission, such as second planetary transmission 170. The motor 133 is operable to apply a primary torque to the output member 138*b* for rotation about the axis of rotation 140, and the quasi-passive elastic actuator 134 (e.g., a quasi-passive linear pneumatic elastic actuator) is selectively operable to store energy during a rotation of the clutched joint module, and to release energy in the form of an augmented torque that can be applied to the output member 138*b* along with the primary torque applied by the motor 133 (the two torques being combined to generate an output via the output member 138*b*).

In one example configuration with the clutched joint module 130 comprising a quasi-passive elastic actuator 134, the clutch mechanism 136 is operable to selectively control the quasi-passive elastic actuator 134 and the generation of the braking force or application of the augmented torque. Indeed, a braking force can be generated to restrict rotation of the joint in some operational scenarios (e.g., scenarios where the primary actuator is active or not active to produce a primary torque, but where rotation of the joint is desired), or an augmented torque can be generated and applied in combination with a primary torque to assist in rotation of the output member and the joint, as discussed below.

More specifically, the quasi-passive elastic actuator 134 is operable to selectively store energy or generate a braking force (when in an elastic or semi-elastic configuration or mode or state) upon a rotation of the input member 138*a* (e.g., where the rotation is either actively carried out using the primary actuator, or passively carried out, such as rotation of a joint under the influence of gravity of some other externally applied force that induces rotation) when the clutch mechanism 136 is engaged or semi-engaged, and is operable to selectively release energy (also when in the elastic or semi-elastic configuration or mode or state) upon a rotation (in the same or a different direction as the rotation for storing the energy) of the input member 138*a* when the clutch mechanism 136 is engaged or semi-engaged to apply the augmented torque to the output member 138*b* in parallel with the primary torque applied by the primary actuator 132, in this case motor 133. The quasi-passive elastic actuator 134 is further operable to neither store nor release energy during rotation of the joint (when in an inelastic configuration or mode or state) when the clutch mechanism 136 is selectively disengaged. In this inelastic state, the input member 138*a* is in "free swing" relative to the output member 138*b*, meaning that negligible resistance is applied within the clutched joint module 130 via the quasi-passive elastic actuator 134 (so that the quasi-passive elastic actuator 134 does not have a stiffness value that would restrict rotation of the input member 138*a* relative to the output member 138*b*). The clutch mechanism 136 can also move from an engaged or semi-engaged state to a disengaged state to dissipate any stored energy (i.e., dissipate any braking force generated, such as when the braking force no longer needed). Thus, the quasi-passive elastic actuator 134 is selectively switchable between the elastic state, the semi-elastic state, and the inelastic state via operation of the clutch mechanism 136. One advantage is that the quasi-passive elastic actuator 134 can be caused to apply, at select times, an augmented torque in parallel with the primary torque applied by the motor 133, which applies a combined torque to the output member 138*b*, thereby reducing the power requirements/demands of the primary actuator 132. With the advantage of an augmented torque, the motor 133 selected can be of a smaller size and a lower power dissipation than otherwise would be required by the robotic system without the assistance of such augmented torque applied by the quasi-passive elastic actuator 134.

In examples described herein, "selective" can mean that the clutched joint module can be controlled in real-time, such as to vary a magnitude and timing of a braking force, vary a magnitude and timing of compression of the elastic component of the quasi-passive actuator and the storing and releasing of energy therein, or vary a magnitude and timing of a primary torque generated by the primary actuator depending upon different operating conditions, operating states, different demands of the robotic system, or as desired by the operator. Selective control can mean that the quasi-passive elastic actuator can be operated in conjunction with the primary actuator all or some of the time or for a desired duration of time. In addition, "selective" can mean, in examples, that one or more operating parameters or the output performance of the clutched joint module can be controlled and varied in real-time as needed or desired. Operating parameters or output performance can include, but is/are not limited to, a magnitude of the augmented torque to be applied, a magnitude of the braking force generated, the stiffness or elasticity of the elastic actuator, the zero or null point of actuation of the elastic actuator, and others.

In examples, "semi-engaged" can mean that the clutch mechanism is engaged, but not fully engaged nor disengaged, such that some slippage occurs within the clutch mechanism (i.e., there is a less than a 1:1 transfer of forces from the input of the clutch to the output of the clutch through the clutch mechanism, such that the clutch mechanism does not act as a rigid system). For example, in the case of the clutch mechanism having a plurality of plates, such as input and output plates, the semi-engaged state would mean that the plates are under a compression force sufficient to compress the plates together some degree, but that some relative movement (i.e., slippage) occurs between the plates (i.e., they are not completely locked up such that they rotate together and movement between them is not completely restricted) and a friction force is generated between them (e.g., a usable braking force). The term "engaged state" as used herein can include the semi-engaged state as these are also meant to describe at least a partially engaged state of the clutch mechanism, as well as to describe the clutch mechanism where the amount of slippage and thus the amount of the braking force (or augmented torque) is controllable and variable between the disengaged state where negligible braking force is generated and fully engaged where the clutch models a rigid connection member.

In examples where the quasi-passive actuator is caused to enter a "semi-elastic state" or mode of operation, the quasi-passive elastic actuator can be actuated to partially compress the elastic or spring component of the quasi-passive elastic actuator to store, and be enabled to release, an amount of energy or enabled to generate a magnitude of a braking force that is less than what would otherwise be achieved if the quasi-passive elastic actuator were in a fully elastic state. Stated another way, "semi-elastic" describes that state in which there is a less than 1:1 transfer of energy or forces, due to rotation of the joint, to the quasi-passive elastic actuator coupled between the input and output members (e.g., because the clutch mechanism is in the semi-engaged state). "Semi-elastic," as used herein, is not intended to refer to the inherent elastic property (i.e., the elasticity) of the elastic component of the quasi-passive elastic actuator, but merely to a degree of compression of the elastic component.

In one example, the motor 133 can be a high-performance Permanent Magnet Brushless DC motor (PM-BLOC), which can be a variant of a frameless torque motor with winding optimized to achieve the desired maximum torque and speed while operating using a 48VDC supply and a high-performance COTS controller, such as electric motor MF0127-032 marketed by Allied Motion.

Figure 5A:
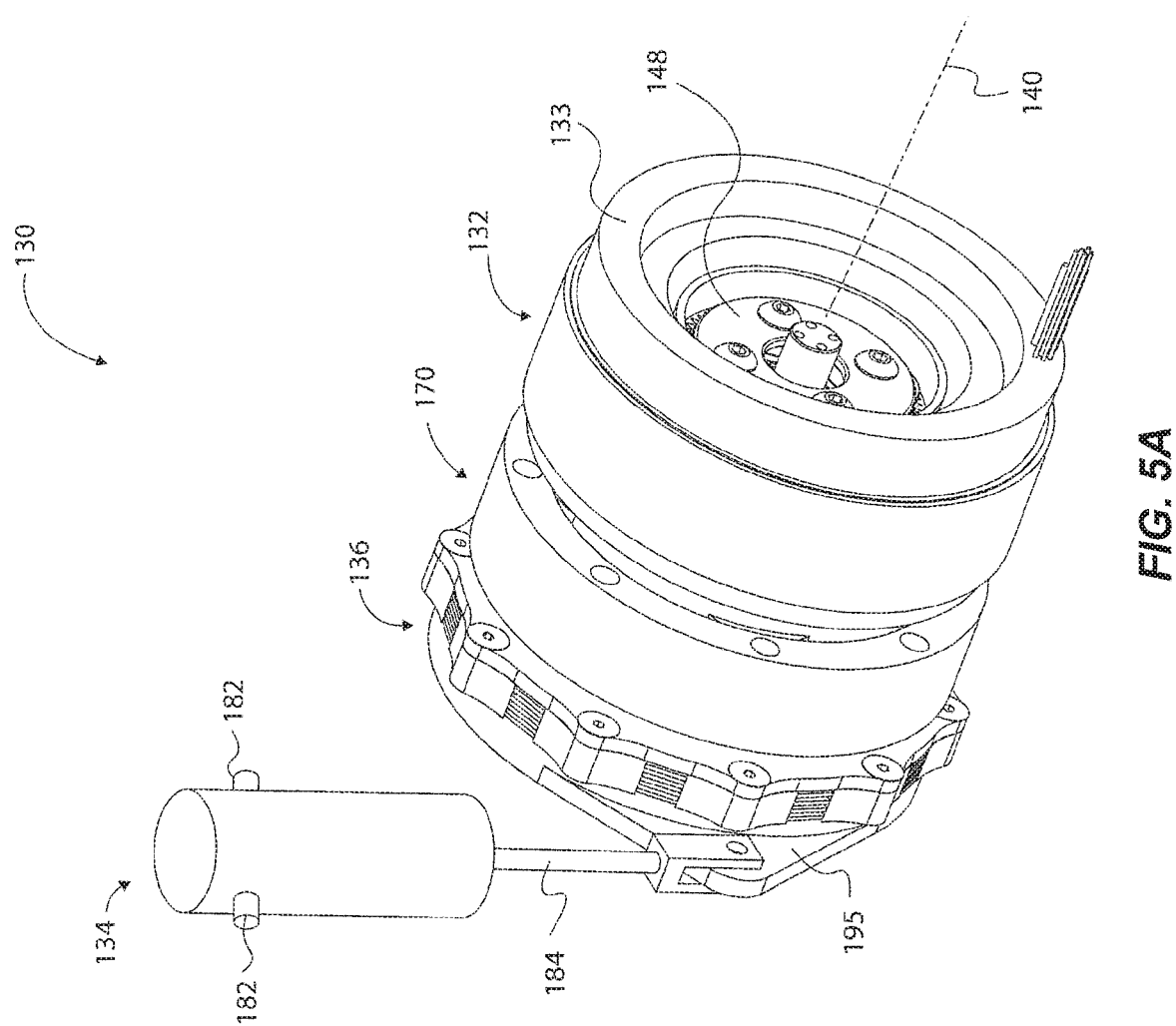
FIG. 5A is an isometric view of a clutched joint module in accordance with an example of the present disclosure.
Figure 5B:
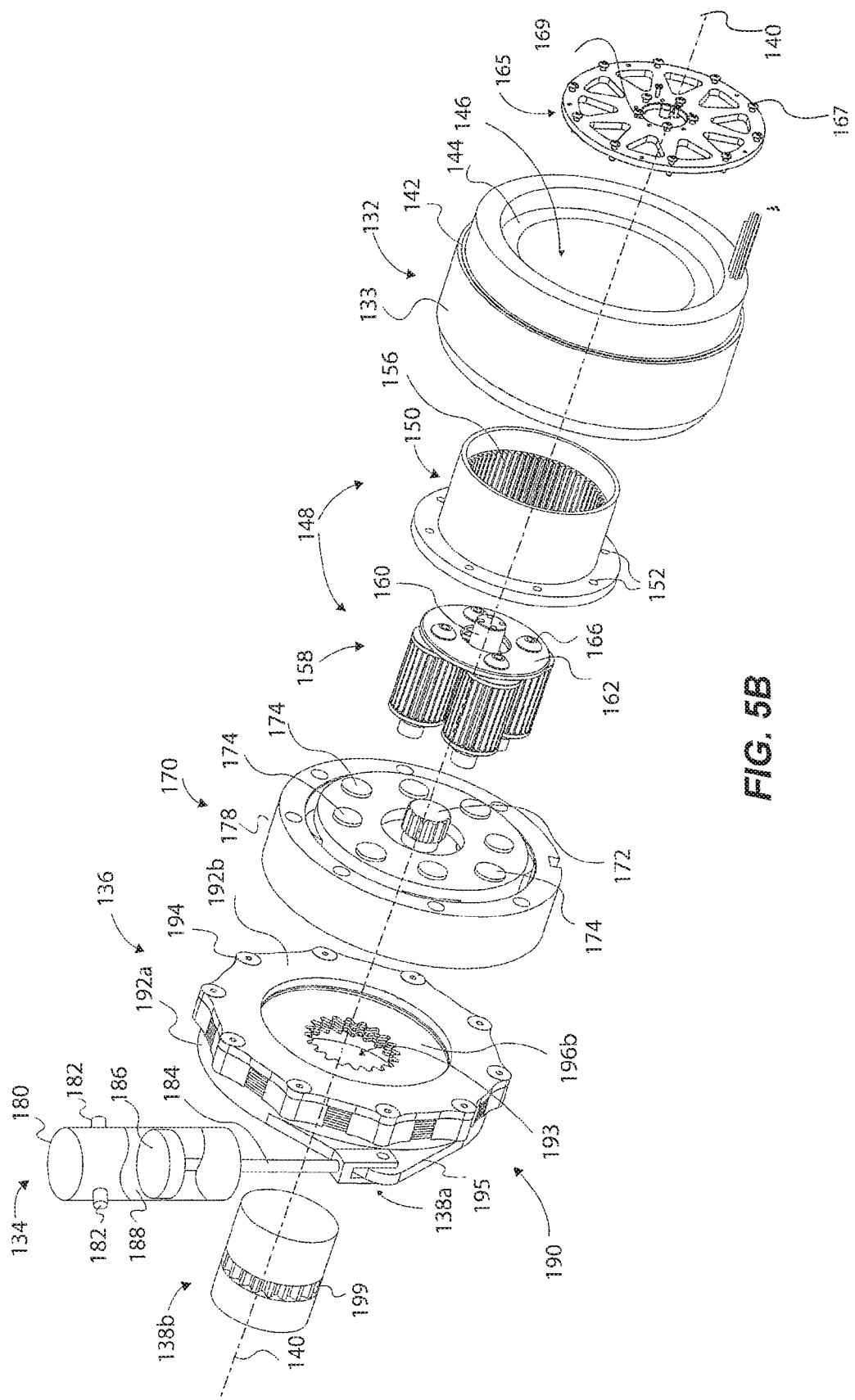
FIG. 5B is an exploded view of the clutched joint module of FIG. 5A.

With reference to FIG. 5B, the motor 133 can comprise a stator 142 and rotor 144 rotatable relative to each other (in a typical fashion for commercially available frameless brushless motors). Thus, the motor 133 of the primary actuator 132 comprises a cylindrical void 146 about the central area of the rotor 144. Advantageously, the first planetary transmission 148 can be positioned (at least partially) within the cylindrical void 146 of the motor 133, which provides a low-profile, compact geared motor configuration as the first planetary transmission 148 and the motor 133 are packaged together, as shown and described.

In the present example the first planetary transmission 148 can comprise a 4:1 geared transmission. Thus, in one example, the first planetary transmission 148 can comprise an outer housing 150 attached to the rotor 144 via fasteners (not shown) through apertures 152 of the outer housing 150. The outer housing 150 can comprise inner gear teeth 156 formed around an inner surface of the outer housing 150. Such gear teeth 156 can be configured to engage corresponding gear teeth of each of four planet gears 158 of the first planetary transmission 148. A sun gear 160 can be disposed centrally between the four planet gears 158 and along the axis of rotation 140, with the sun gear 160 comprising teeth engaged to the teeth of each of the four planet gears 188 (see FIG. 5C).

Figure 5C:
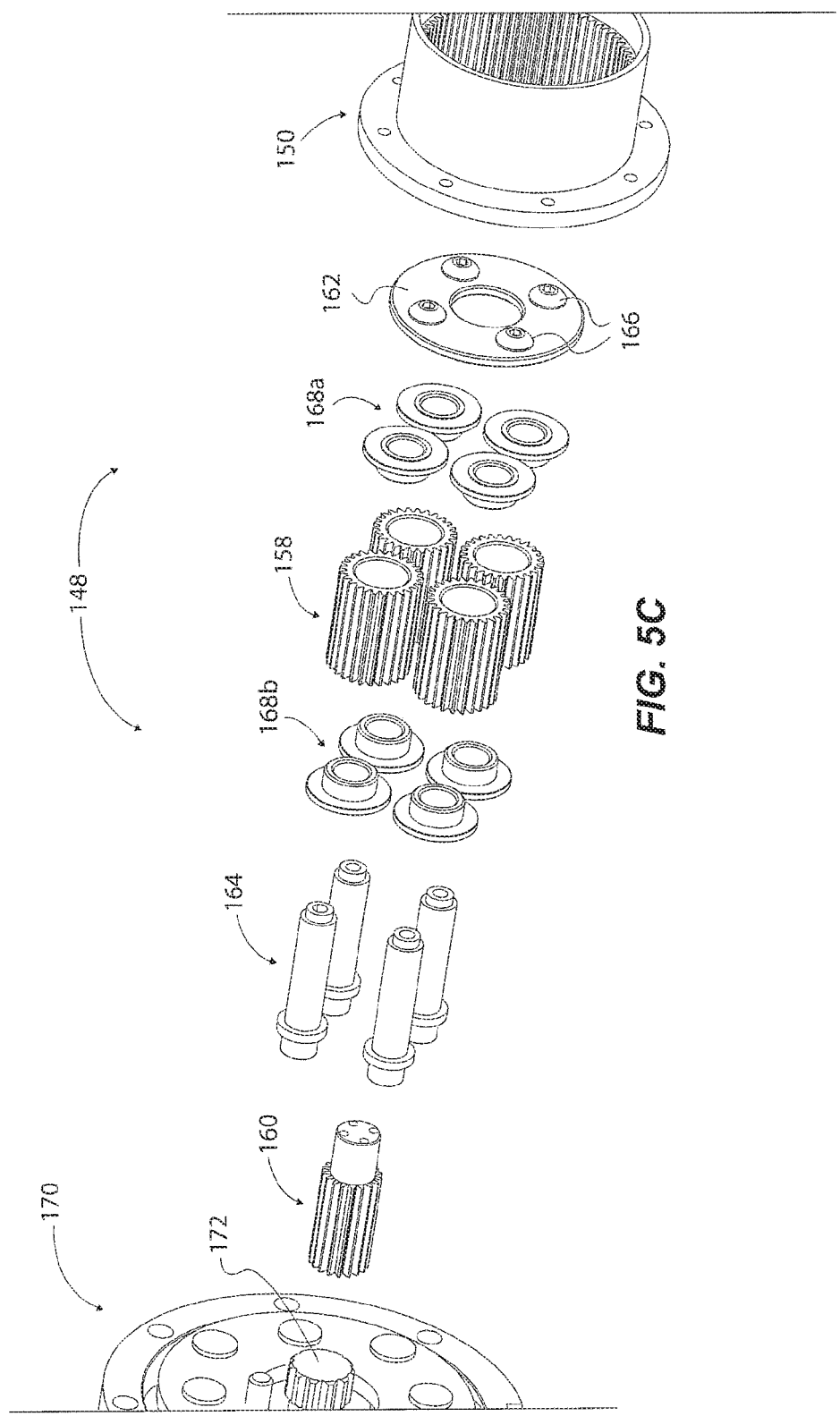
FIG. 5C is an exploded view of a portion of the clutched joint module of FIG. 5A showing the planet gears of the planetary transmission.

With reference to FIG. 5C, the planet gears 158 rotate about their own central axis and around the sun gear 160. A carrier plate 162 can be fastened to four carrier pins 164 via fasteners 166. The planet gears 158 can each comprise a hollow tubular body that rotatably receives a respective carrier pin (see carrier pins 164) through the hollow body of each planet gear 158. The planet gears 158 can each be rotatably interfaced to respective carrier pins 164 via front bushings 168a and rear bushings 168b. A transfer wheel 165 can be fastened to the rotor 144 via perimeter fasteners 167, and the transfer wheel 165 can comprise a central coupling portion 169 coupled to the sun gear 160. Therefore, upon receiving a primary control signal (e.g., from a controller operable to cause rotation of the clutched joint module), the motor 133 rotates the rotor 144 about the axis of rotation 140, which causes the transfer wheel 165 to rotate, which thereby causes the sun gear 160 to rotate, thereby rotating the planet gears 158. Note that the transfer wheel 165 is only shown in FIGS. 5B and 5D.

The planet gears 158 can be configured to drive the second planetary transmission 170. Specifically, the planet gears 158 can be coupled to a supplemental sun gear 172 of the second planetary transmission 170 via the carrier pins 164. Thus, upon rotation of the supplemental sun gear 172, planet gears 174 rotate (FIG. 5B), which rotates a carrier 176 (FIG. 5D) (i.e., the output of the second planetary transmission 170). Accordingly, an outer ring 178 of the second planetary transmission 170 comprises the stationary component, which can be coupled to the motor 133 via a support housing or frame (not shown). The carrier 176 can be coupled to the output member 138b, such that rotation of the carrier 176 causes rotation of the output member 138b.

Support frames, such as described regarding FIG. 5A of U.S. patent application Ser. No. 15/810,102, filed Nov. 12, 2017, which is incorporated by reference in its entirely herein, can be utilized to house and structurally support the primary actuator 132, the secondary planetary transmission 170, and the clutch mechanism 136, of the present disclosure in a similar manner.

Planetary and other types of transmissions, such as the second planetary transmission 170, are known and commercially available. One such example of a planetary transmission that can be incorporated into the clutched joint module is Matex's 75-4MLG12 planetary transmission, which is a 4:1 geared unit with a 2.95 inch outside diameter having a 118 N-m peak torque, weighing just 500 grams. Another benefit of providing a transmission is the fact that, in one example, the transmission (e.g., 148, 170) can be situated to be in-line or collinear with the axis of rotation 140 of the motor 133 (and consequently of the joint module 130), which allows for compact mounting configurations. Other examples may locate the transmission offset from one or more other components of the clutched joint module, with the transmission being operable with the primary actuator.

Figure 5D:
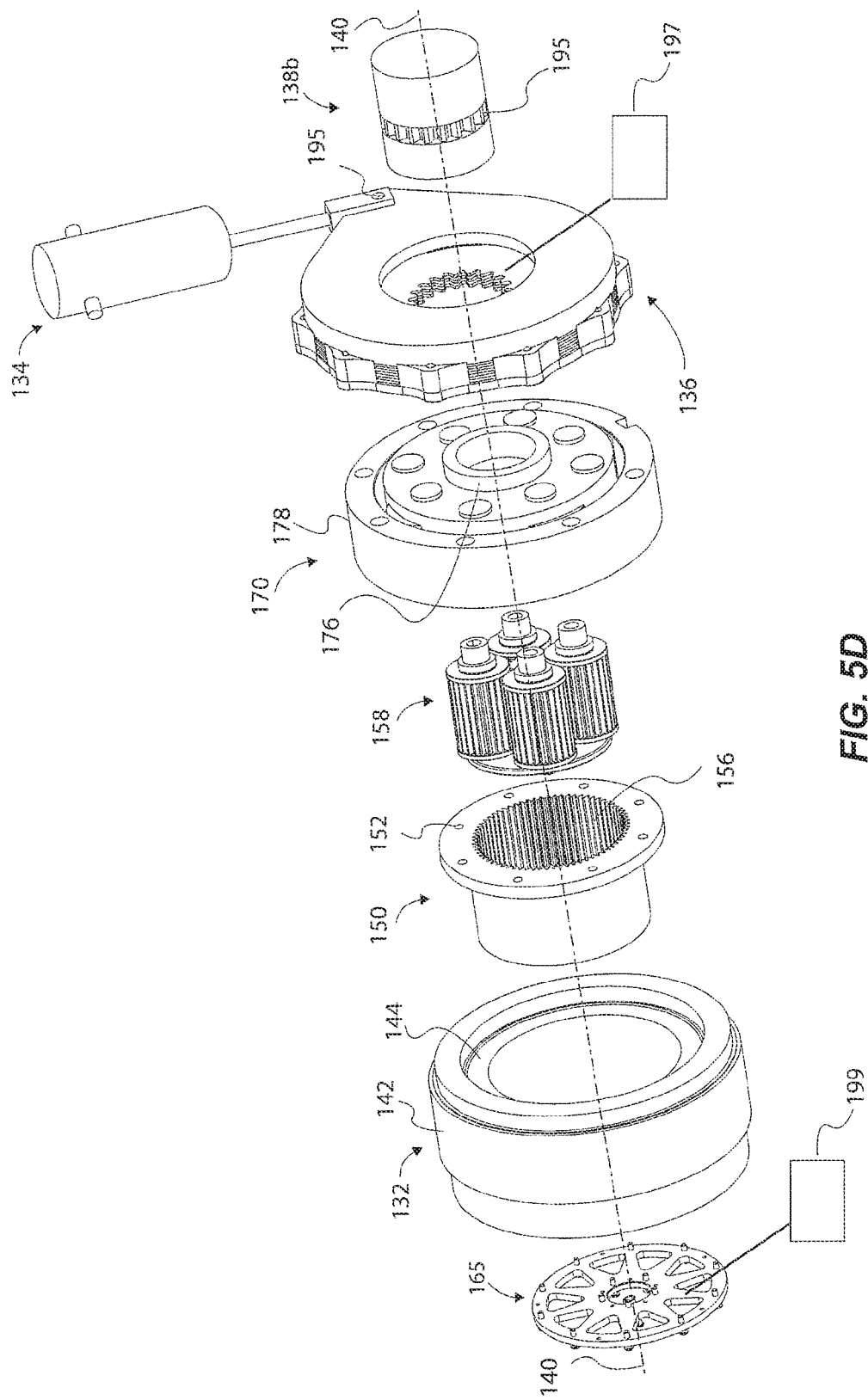
FIG. 5D is an exploded view of the clutched joint module of FIG. 5A.

With reference to FIG. 5D, the output member 138b can be a shaft attached to a central portion of the carrier 176, such that rotation of the carrier 176 causes rotation of the output member 138b about the axis of rotation 140. This is not intended to be limiting as other output member configurations are possible and contemplated, as well as how these interface with and how these are coupled to the carrier 176. This provides a 4:1 geared-down transmission arrangement (from the output rotation of the first planetary transmission 148 to the output rotation of the output member 138b). Thus, the present example provides a 16:1 final drive transmission from the motor 133 to the output member 138b. Other planetary transmission types and gear reduction schemes can be used instead of a 4:1 transmission, such as a 3:1 planetary gear scheme. Note that output member 138b is shown generically as a solid body shaft, but it could take other suitable forms and configurations for interfacing with the second planetary transmission 170 and with a robotic support member, for example.

To reduce build height, as well as to provide other advantages, the first planetary transmission 148 can be configured to be positioned inside of the rotor of the motor 133. Depending on the motor selected, the inside diameter of the rotor can dictate the maximum outside diameter of the planetary transmission. Once the planetary ring has been constrained by its outside diameter, there are a limited amount of options for gear ratios and output torques available. The output ratio is determined from the ratio of the number of teeth on the ring gear to the number of teeth on the sun gear. To obtain a higher reduction in the compact design of the planetary unit, the sun gear diameter can be reduced, which generally corresponds to less power transmission. The capacity to transmit higher torques is reduced with the smaller sun gear. A balance of reduction and strength can be considered for a planetary unit that will physically fit inside the motor rotor. By implementing a helical cut gear, higher forces can be transmitted on the gear teeth making the unit stronger. A wider tooth will also improve the load carrying capacity of the gear, however this increases the weight as well. Multiple stages of a planetary transmission can be cascaded (e.g., 148 and 170) to produce extremely high gear reduction in a relatively compact package. In addition, the sun gear can be configured to make contact with several teeth simultaneously, wherein the contact ratio will be much higher than a conventional spur gear transmission. In some examples, a single stage planetary transmission can achieve efficiencies of around 97%. At higher RPM, gear noise can be an issue, especially for multiple stage planetary units. Another benefit of planetary gears is the fact that the transmission can be positioned in-line with the motor, which allows for compact mounting configurations within the joint module of the robot or robotic assembly.

Advantageously, the motor 133, the first and second planetary transmissions 148 and 170, and the output member 138*b* can each operate or rotate about substantially the same axis of rotation as the axis of rotation 140 of the clutched joint module 130 (i.e., the axis of rotation of the corresponding joint of the robot or robotic assembly), which axis of rotation in some cases, can also correspond to the axis of rotation of a human joint, such as an operator in an exoskeleton. Said another way, each axis of rotation of the motor 133, the first and second planetary transmissions 148 and 170, and the output shaft 138*b* can be arranged to be collinear or substantially collinear with the axis of rotation 140. This locates the mass of such components close or near to the axis of rotation of a particular joint, which further minimizes power requirements by the motor 133 to actuate the joint.

In the illustrated example of FIGS. 5A-5E, the output member 138*b* applies a relatively higher torque at a low speed with very little noise and backlash via the planetary transmissions 148 and 170, all in a compact form with the planetary transmission 148 being housed within the void 146 of the motor 133, and because of the cascading arrangement of the motor 133 and the first and second planetary transmissions 148 and 170 all arranged along, and operating about or around, the axis of rotation 140.

With particular reference to FIGS. 5B-5E, and as introduced above, the quasi-passive elastic actuator 134 is operable to apply an augmented torque to rotate the output member 138*b* along with the torque applied by the primary actuator 132, or to generate a braking force within the clutched joint module. In one example, the quasi-passive elastic actuator 134 can be a linear pneumatic spring comprising a housing 180 and a robotic support member interface 182 coupled to the housing 180, and pivotally coupleable to a robotic support member as part of a joint within a limb of the robot or robotic assembly (e.g., 105*f* of FIG. 4C). The robotic support member interface 182 can be one or two bearings, fasteners, or other coupling device(s) that can couple the housing 180 to such robotic support member.

The quasi-passive elastic actuator 134 can comprise a piston rod 184 pivotally coupled, on one end, to a coupling portion 195 of the clutch mechanism 136. On the other end, the piston rod 184 can be coupled to a piston cylinder 186 that is slidably supported within the housing 180. Accordingly, the housing 180 can comprise a compression gas chamber 188 adjacent/above the piston cylinder 186 and an expansion chamber adjacent/below the piston cylinder, these being sealed off by the piston cylinder 186. As shown, the piston rod 184 can be pivotally coupled to the clutch mechanism 136 off-center relative to the axis of rotation 140. Accordingly, as further detailed below, and with the clutch mechanism 136 engaged or semi-engaged to place the quasi-passive actuator 134 in the elastic or semi-elastic state, as further discussed below, upon movement of a robotic support member (e.g., 105*f* of FIG. 40), the housing 180 can move downwardly, for instance, which causes the piston cylinder 186 to translate upwardly within the housing 180, which causes gas in the gas compression chamber 188 to compress, thereby storing energy within the quasi-passive elastic actuator 134. This action can also be used to generate a braking force (i.e., compression of the elastic element generates a force that can be used to restrict movement of the output member relative to the input member). Furthermore, once stored, the energy can be dissipated at any time without being used either as a braking force or to apply an augmented torque (by disengaging the clutch mechanism 136) or released (by keeping the clutch mechanism 136 at least partially engaged) to apply an augmented torque that can be combined with a primary torque by the motor 133, as discussed herein. Note that the quasi-passive elastic actuator 134 is shown somewhat schematically in FIG. 5B, but it can have other various features of known linear air spring actuators for properly compressing and releasing gas pressure energy. Furthermore, as indicated below, other types of quasi-passive elastic actuators can be incorporated, such as those comprising a pneumatic or liquid elastic element, those comprising a mechanical elastic element, and others.

Generally, the quasi-passive elastic actuator 134 is switchable between an elastic configuration or state (including a semi-elastic configuration or state) and an inelastic configuration or state via operation of the clutch mechanism 136 for selectively controlling application of the augmented torque applied by the quasi-passive elastic actuator 134. In one example, with reference to FIGS. 5B, 5D, and 5E, the clutch mechanism 136 can comprise a multi-plate clutch mechanism comprising a clutch housing 190 that includes a first support frame 192*a* and a second support frame 192*b* coupled together via fasteners 194. Each of the first and second support frames 192*a* and 192*b* comprises a central opening to receive and allow passage of the output member 138*b* (FIG. 5B). A plurality of input plates 196*a* (e.g., four total) are retained by the clutch housing 190. That is, the first support frame 192*a* can comprise perimeter retaining features 201 (e.g., slots or recesses) that receive and retain perimeter flanges 191 of each of the input plates 196*a* to restrict movement of the input plates 196*a* relative to the clutch housing 190. A plurality of output plates 196*b* (e.g., four total) can each be slidably or frictionally interfaced (i.e., sandwiched between) with adjacent input plates 196*a*, and in an alternating manner as best shown in FIG. 5E. The output plates 196*b* can each have a curvilinear perimeter that is slidably supported within curved inner surfaces of the first support frame 192*a*. Each output plate 196*b* can comprise a splined central aperture 193 that engages a splined portion 199 of the output member 138*b* (FIGS. 5B and 5D).

With reference to FIG. 5D, an actuator 197 can be operable to switch the clutch mechanism 136 between an engaged state, a semi-engaged state and a disengaged state. In one example, the actuator 197 can comprise a type that is operable to apply a selective, variable force to the input and output plates 198*a*, 198*b*. The actuator 197 can comprise an electric motor having a receiver in communication with a controller (wired or wirelessly) of a computer system that controls operation of the clutch mechanism 136 via the actuator 197. Thus, upon receiving a clutch control signal, the actuator 197 can cause compression of the input plates 196*a* between the output plates 198*b* to restrict rotation of the output member 138*b* relative to the input member 138*a* (further detailed below). This is achieved as the input plates 198*a* are retained by the clutch housing 190, so when the output plates 198*b* are compressed between respective the input plates 196*a*, a braking friction force between adjacent input and output plates 198*a* and 198*b* restricts rotation of the output plates 196*b* relative to the input plates 198*a*. In one aspect, with the clutch mechanism 136 operating in the engaged state, movement between the input plates 198*a* and the output plates 198*b* can be completely restricted (i.e., the clutch can be fully engaged). Consequently, this restricts rotation of the input member 136*a* relative to the output member 136*b* so that they rotate together in the same rotational direction and speed (because the output plates 198b are engaged with the output member 138b). In another aspect, with the clutch mechanism 136 operating in a semi-engaged state, movement between the input plates 198a and the output plates 198b can be partially restricted by the actuator 197 applying a smaller compression force to the input and output plates 198a, 198b, such that some movement between the input plates 198a and the output plates 198b is facilitated or caused to occur. In the engaged or the semi-engaged state, the clutch mechanism 136 and the quasi-passive elastic actuator 134 can function as a brake, or in other words, can provide a braking force operable to dissipate energy within the joint module, or these can function to apply an augmented torque to the output member. The degree or magnitude of the compression force applied by the actuator 197 to the input and output plates 198a, 198b can be dynamically controlled in real-time by controlling or varying the amount of force generated and applied by the actuator 197. In the disengaged state, the clutch mechanism 136 is not intended to restrict movement between the input plates 198a and the output plates 198b.

More specifically, the actuator 197 can be configured and controlled as a binary device (i.e., the clutch is either on/engaged or off/disengaged) when applying a compression force to compress the plates together, and when removing the compression force to release compression between the plates. Alternatively, the actuator 197 can be configured and controlled as an analog device, meaning a variable force can be applied by the actuator 197 to compress the plates to a varying degree to generate a braking force and to facilitate gradually storing energy or dissipating/releasing stored energy in a more controlled manner for damping or braking purposes (i.e., the clutch mechanism 136 is in a semi-engaged state and the quasi-passive elastic actuator 134 is in a semi-elastic state). In one example operational scenario, the clutch mechanism 136 can be fully engaged or semi-engaged such that the quasi-passive elastic actuator 134 at least partially stores energy. This stored energy can function to generate a braking force that can restrict rotation of the output member (e.g., such as in the case where the primary actuator is inactive and not producing a primary torque, yet rotation of the joint is still desired or needed (e.g., rotation of the joint under the influence of gravity or in response to some externally applied force to the robotic system)), or it can be released as an augmented torque to assist the primary actuator. Furthermore, in the event of the release of the energy as an augmented torque, when the quasi-passive elastic actuator 134 is releasing energy in the elastic or semi-elastic states (e.g., during a stance extension), the actuator 197 can be operated or moved to slightly compress the plates to generate a gradual "braking force" about the plates so that the augmented torque can be discharged or applied in a controlled, gradual manner. This can help to reduce the likelihood of applying a torque within the robotic system that may actuate the joint too quickly and with too much velocity at an initial stage of actuation (which, in the case of an exoskeleton, can cause discomfort to the operator and can disrupt a desired fluid/natural movement of an exoskeleton limb). This may also be advantageous when lowering a load with the robotic system, where it is desirable to lower the load in a controlled manner by controlling the amount of braking force applied by plates of one or more clutched joint modules of the robotic system. Also in the case of an exoskeleton, this may also be advantageous when an operator wearing the exoskeleton moves from a crouching position while picking up a load, wherein the stance extension may need to be slower or more controlled. In such a case, the plates of the clutches of the hip and/or knee clutched joint modules may then be controlled as brakes to controllably dissipate stored energy released by the associated quasi-passive elastic actuators.

As further explanation, and to further illustrate, the multi-plate configuration of the clutch mechanism 136 can act as a brake. This is achieved by controlling the compression force applied to the input and output plates 198a and 198b, thus providing a beneficial energy saving mode of operation. For instance, by controlling the braking force, the robotic system can be caused to lower a load subject to gravity by simultaneously controlling the brake force and the torque applied by the primary actuator (which in some cases can be zero), thus providing a very efficient mode of operation. The controlled braking can also be used to store energy in the elastic component of the quasi-passive elastic actuator. For example, an exoskeleton operator could lower him/herself to a squat position by letting part of his weight be supported by the exoskeleton while getting in the squat position. In this process, energy can be stored in the quasi-passive elastic actuator, while controlling the torque by controlling the braking force. At least some of the energy may then be recovered as the robotic device moves to the standing position, and additional torque may be provided, if required, by the primary actuator that would combine with the torque produced by the quasi-passive elastic actuator. In the latter example the clutch mechanism 136 can be used as a brake or as a clutch, or both.

With the clutch mechanism 136 in the engaged or semi-engaged state, the quasi-passive elastic actuator 134 is therefore operable in the elastic and semi-elastic states, respectively, to store or release energy upon movement of the input member 136a relative to the output member 136b. Conversely, upon receiving a clutch control signal, the actuator 197 can operate to place the clutch mechanism 136 in the disengaged state. That is, the actuator 197 operates to remove or release the compression force and pressure from plates, which thereby allows the input and output plates 198a, 198b to freely rotate relative to one another. This permits "free" rotation of the input member 138a relative to the output member 138b, therefore placing the quasi-passive elastic actuator 134 in its inelastic configuration where the quasi-passive elastic actuator 134 neither stores nor releases energy, but is rather passive in its function where it has no appreciable impact or influence on the operation of the joint module (a "free-swing" mode). Thus, the quasi-passive elastic actuator 134 exerts negligible resistance in this "free-swing" mode, when the clutch mechanism 136 is disengaged, so that the input and output members 138a and 138b can freely rotate relative to each other with minimal resistance.

It is noted that in FIG. 510, the actuator 197 is shown generically as a box operable with a part of the clutch mechanism 136. This is to illustrate generally an actuator, that those skilled in the art will recognize can take many forms and configurations. For instance, the actuator 197 can comprise an electric motor having a movable member associated therewith that is actuatable by the motor to exert and remove a biasing or compression force against the input plates 196b, such as a rotatable cam member, a ramped ring member, or other suitable movable device, in order to compress the plates 198a and 198b together to partially or completely restrict relative movement between them, as well as to facilitate their expansion to remove any compression forces. In other examples, the actuator 197 can comprise a piezoelectric actuator, a dielectric actuator, an electromagnetic actuator, or other similar low-power actuator. Thus, upon sending a clutch control signal to the actuator 197 from a controller, the actuator 197 can be caused to actuate the movable member to apply (or remove) a compression force to the plates 198a and 198b. In another example, the movable member (actuatable by an electric motor of the actuator 197) can comprise force application devices disposed on either side of the collective plates 198a and 198b (somewhat similar to those found in a bicycle disk brake), such that actuation of the actuator 197 causes a compression force to be applied to the collection of plates 198a and 198b from both sides of the plates 198a and 198b, which can help to reduce wear on the plates. In one aspect, the plates 198a and 198b can be comprised of Teflon-impregnated aluminum, composites, plastics, polymers, certain metals, and the like.

Accordingly, upon a first rotation of the input member 138a relative to the output member 138b, the quasi-passive elastic actuator 134 stores energy (as discussed above) when the clutch mechanism 136 is engaged (i.e., the plates 198a and 198b are being compressed). Such rotational movement can be the result of a gait movement (e.g., of a lower body exoskeleton comprising one or more clutched joint modules) that causes a first robotic support member (e.g., 104e) to rotate about a second robotic support member (e.g., 104d), such as during a gait cycle between point B to C of FIG. 2. Upon a second rotation (e.g., of 104e and 104d between points A to B of FIG. 2), the quasi-passive elastic actuator 134 can release its stored energy when the clutch mechanism 136 is controlled/maintained in its engaged or semi-engaged state, which facilitates application of the augmented torque to combine with the primary torque from the primary actuator to assist in the rotation of the output member 136b, as detailed above. The first and second rotations can be in the same or different directions.

Concurrently (and upon the second rotation of the input member 138a relative to the output member 138b), the primary actuator 132 can be operated to apply a primary toque (along with the augmented torque of the quasi-passive elastic actuator 134) to rotate the output member 138b about axis of rotation 140 to actuate the clutched joint module 130. Because the torque applied by the primary actuator 132 is supplemented with the torque applied by releasing stored/recovered energy via the quasi-passive elastic actuator 130, the electric motor 132 can be selected from a group of smaller (e.g., less power dissipation) motors than would otherwise be needed in an equivalent robotic assembly not employing a quasi-passive elastic actuator, which contributes to the compact configuration of the module 130, as discussed above.

At a select time, such as upon a third rotation of the input member 138a relative to the output member 138b (e.g., of 104e and 104d along points from C, D, E, F, and A of FIG. 2), the clutch mechanism 136 can be switched to the disengaged state (i.e., the actuator 197 releases the applied-compression force) such that the output plates 198b freely rotate relative to the input plates 198a. As a result, the quasi-passive elastic actuator 134 neither stores nor releases energy (inelastic configuration) upon rotation of the input member 138a relative to the output member 138b. In this inelastic configuration, the input member 138a is in "free swing" relative to the output member 138b, meaning that negligible resistance is applied via the quasi-passive elastic actuator 134 (so that the actuator 134 does not have a stiffness value restricting rotation of the input member 138a relative to the output member 138b). Thus, in this manner the quasi-passive elastic actuator 134 is switchable between the elastic configuration or state, the semi-elastic configuration or state, and the inelastic configuration or state via operation of the clutch mechanism 136 so that the quasi-passive elastic actuator 134 can be operable to either apply the augmented torque in parallel with the torque (i.e., primary torque) applied by the primary actuator 132, thereby applying a combined torque to rotate the output member 138b, or to function passively where the quasi-passive elastic actuator 134 neither stores nor releases energy and where the primary torque by the primary actuator 132 is not augmented by a torque from the quasi-passive elastic actuator 134.

Each of such first, second, and third rotational movements of the input member 138a relative to the output member 138b (e.g., of a robotic joint) can be sensed by one or more position and/or force sensors 199 (FIG. 5D) associated with and/or coupled to the joint module 130 to sense a direction, speed, and/or force associated with rotation of the joint module 130. The one or more sensors can be coupled at various locations, such as a frame support of the joint module 130, at the input member 138a and/or output member 138b, at the transfer wheel 165, and/or other suitable locations of the joint module 130. In one example, a particular position sensor (e.g., Hall effect sensor) can sense a relative position of the input member 138a, and, upon the second rotation (discussed above), the position sensor can communicate a position signal to a computer system, having a central processing unit, that processes the position signal, and then ultimately transmits an appropriate clutch signal to the clutch actuator 197 to engage (or maintain engagement of) the clutch mechanism 136 (for instance), and/or transmits a primary actuator signal to the motor 133 to apply the primary torque, as discussed further herein.

In the example where the clutched joint module 130 is incorporated as a shoulder joint (e.g., 109f) of an arm of an exoskeleton (FIG. 4A), assume a human operator wearing the exoskeleton desires to lift a 200 pound payload. As the operator moves the arm downwardly (e.g., the "first rotation" of the shoulder joint), the clutch mechanism 136 is controlled to the engaged state so that the quasi-passive elastic actuator 134 stores energy (gravitational forces exerted on the robotic arm can also assist to lower the arm, thereby storing energy in the quasi-passive elastic actuator 134). Then, as the operator grabs and begins to lift the payload (i.e., the "second rotation" of the shoulder joint), the clutch mechanism 136 can be maintained in the engaged state so that the quasi-passive elastic actuator 134 can release the stored energy to apply the augmented torque to actuate the shoulder joint module to assist to lift the payload. Concurrently, a primary control signal can be received by the motor 133 to cause the motor 133 to apply a primary torque. The primary torque, along with the augmented torque, operate together to actuate the shoulder joint module to lift the payload. And, upon releasing the payload, the clutch mechanism 136 can be controlled/switched to the disengaged state to remove any spring stiffness that may exist about the quasi-passive elastic actuator 134, thereby placing the joint in free swing mode so that the operator can lower the arm to a desired position with minimal effort (e.g., using gravitational forces).

Note that spring stiffness of the quasi-passive elastic actuator 134 (and 204 of FIG. 6A and 205 of FIG. 6C) is a function of chamber geometries, as well as gas pressure charge, and other geometries of the assembly. Thus, the magnitude of stiffness for a given joint module can be adjustable for mission-specific payloads and terrain-specific gaits while the clutch mechanism determines exactly when that stiffness is engaged for energy recovery during the support phase (elastic configuration), for instance, and when it is disengaged during the free swinging phase (inelastic configuration). For instance, the volume of the compression chamber 188 can be selected of a particular volume along with the density of the gas. Also, the particular joint location can be determinative of the magnitude of the selected stiffness value. For instance, the charge pressure for a knee joint and the joint speed would both be significantly larger than required from a hip joint, and the charge pressure for an elbow joint may be lower than the charge pressure for a shoulder joint. Thus, the chamber 188 can be pre-charged with a desired gas pressure to define a selected stiffness value determinative by the particular application and location of the joint on an exoskeleton, for instance. This can be anywhere from a nominal pre-charge value of 0 psi up to 1500 psi, or more, depending on the particular applications, such as the location of the joint on an exoskeleton and/or the possible tasks of the particular joint. Moreover, this stiffness value can be modified by modifying the pre-charge pressure amount.

It is to be specifically noted that in another example configuration of the clutched joint module 130, the quasi-passive elastic actuator 134 may be optional (i.e., not included in or part of the clutched joint module 130, or rather the clutched joint module 130 is configured without a quasi-passive elastic actuator). For instance, a joint (e.g., one associated with wrist rotation, or shoulder abduction/adduction), may only be configured with an active actuator (i.e., a primary actuator as discussed herein, even though the term "primary" suggests that another torque generating element exists) and without an elastic element. Accordingly, an input member (e.g., a robotic support member) can be directly coupled to the clutch housing 190 rather than to a quasi-passive elastic actuator, such as at an off center position (e.g., at coupling portion 195). In this configuration, the clutch mechanism 136 can still be selectively operated between the engaged state, semi-engaged state and the disengaged state to control movement between the output and input members 138a and 138b. Indeed, in one aspect, the clutched mechanism 136 can be engaged or semi-engaged to restrict movement between the output and input members 138a and 138b, thereby facilitating application of the primary torque to the output member by the motor 133. In another aspect, the clutched mechanism 136 can be disengaged to facilitate free swing of the joint between the input and output members 138a and 138b. To illustrate this example configuration, in one operational scenario, with the clutched joint module operating without a quasi-passive elastic actuator, and where no primary torque is applied in the clutched joint module 130 (i.e., the primary actuator is not active or actuated), the clutch mechanism 136 can be operated in the engaged or semi-engaged states to generate a braking force that can be used to restrict, to some degree, relative rotation between the input and output members 138a, 138b of the clutched joint module 130. In another operational scenario, again with the clutched joint module 130 operating without a quasi-passive elastic actuator, and where a primary torque is to be applied to the output member 138b to rotate the joint, the clutch mechanism 136 can be operated in the engaged or semi-engaged states to facilitate application of the primary torque to the output member 138b in a controlled manner by virtue of selective, variable compression of the plates of the clutch mechanism 136. These two operational scenarios illustrate the selective capabilities of within the clutched joint module 130 to cause the clutched joint module 130 to function as a clutch for application of a primary torque or as a brake to restrict rotation.

FIGS. 6A-6G illustrate various aspects of a clutched joint module 200 according to an example of the present disclosure, which can be incorporated into any suitable robotic joint of a robotic assembly (e.g., 100, 101). The clutched joint module 200 is similar in many respects to the clutched joint module 130 shown in FIGS. 5A-5E. As such, the description set forth above can be applicable here where the various clutched joint modules 130 and 200 comprise the same or similar elements or perform in the same or a similar way, as will be recognized by those skilled in the art. For example, the clutched joint module 200 can be configured without a quasi-passive elastic actuator (i.e., the quasi-passive elastic actuator 204 is optional).

In one example configuration, the clutched joint module 200 can comprise a primary actuator 202, an optional quasi-passive elastic actuator 204, and a clutch mechanism 206 operatively coupled to each other, with each situated or arranged along and operable about an axis of rotation 210. As further detailed below, an input member 208a and an output member 208b can be directly or indirectly coupled to respective support members of the robotic assembly, which support members are rotatable relative to each other about the axis of rotation 210 corresponding to a joint of the robotic assembly, which ultimately corresponds to an axis of rotation of a degree of freedom of a human joint, such as joint 107f associated with clutched joint module 109f of FIG. 4C for a shoulder joint having a flexion/extension degree of freedom.

The primary actuator 202 can comprise a motor 212 and a transmission, such as a first planetary transmission 214. Optionally, a second transmission, such as a second planetary transmission 216, can be coupled to the first planetary transmission 214. The motor 212 is operable to apply a primary torque to the output member 208b for rotation about the axis of rotation 210 and the quasi-passive elastic actuator 204 (e.g., a quasi-passive linear pneumatic elastic actuator) is selectively operable to function similar to the quasi-passive elastic actuator 134 discussed above to generate a braking force and/or to apply an augmented torque to the output member 208b along with the primary torque applied by the motor 212, or to be actuated to generate and apply a braking force. The clutch mechanism 206 is operable to selectively control the application of the augmented torque, or a braking force, as discussed herein.

In one example configuration with the clutched joint module 200 comprising a quasi-passive elastic actuator 204, the clutch mechanism 206 is operable to selectively control the quasi-passive elastic actuator 204 and the generation of the braking force or application of the augmented torque. Indeed, a braking force can be generated to restrict rotation of the joint in some operational scenarios (e.g., scenarios where the primary actuator 212 is active or not active to produce a primary torque, but where rotation of the joint is desired), or an augmented torque can be generated and applied in combination with a primary torque to assist in rotation of the output member 208b and the joint, as discussed below.

More specifically, the quasi-passive elastic actuator 204 is operable to selectively store energy or generate a braking force (when in an elastic or semi-elastic configuration or mode or state) upon a first rotation of the input member 208a (e.g., where the first rotation is either actively carried out using the primary actuator, or passively carried out, such as rotation of a joint under the influence of gravity of some other externally applied force that induces rotation) when the clutch mechanism 206 is engaged or semi-engaged, and is operable to selectively release energy (also when in the elastic configuration or mode or state) upon a second rotation of the input member 210a when the clutch mechanism 206 is engaged or semi-engaged to apply the augmented torque to the output member 208b in parallel with the torque applied by the primary actuator, in this case the motor 212. The quasi-passive elastic actuator 204 is further operable, such as upon a third rotation, to neither store nor release energy during rotation of the joint (when in an inelastic configuration or mode or state) when the clutch mechanism 206 is selectively disengaged. In this inelastic state, the input member 208a is in "free swing" relative to the output member 208b, meaning that negligible resistance is applied within the clutched joint module 200 via the quasi-passive elastic actuator 204 (so that the quasi-passive elastic actuator 204 does not have a stiffness value that would restrict rotation of the input member 208a relative to the output member 208b). The clutch mechanism 206 can also move from an engaged or semi-engaged state to a disengaged state to dissipate any stored energy (i.e., dissipate any braking force generated, such as when the braking force no longer needed). Thus, the quasi-passive elastic actuator 204 is selectively switchable between the elastic state, the semi-elastic state and the inelastic state via operation of the clutch mechanism 206. One advantage is that the quasi-passive elastic actuator 204 can be caused to apply, at select times, an augmented torque in parallel with the primary torque applied by the motor 212, which applies a combined torque to the output member 208b, thereby reducing the power requirements/demands of the primary actuator 202 (e.g., motor 212). With the advantage of an augmented torque, the motor 212 selected can be of a smaller size and lower power dissipation than otherwise would be required by an equivalent system without the assistance of the augmented torque provided by the quasi-passive elastic actuator 204.

In one example, the motor 212 can be a high-performance Permanent Magnet Brushless DC motor (PM-BLDC), similar to the one discussed above. In other examples, the electric motors discussed and shown in the examples can be replaced with a suitable hydraulic actuator, pneumatic actuator, or other types of actuators or motors suitable for functioning as a primary actuator, as will be recognized by those skilled in the art. Such electric motors and alternative motors and actuators can be arranged in series or parallel to cause rotation along the same axis of rotation 140. In a specific example, the primary actuator can be arranged to rotate the transfer wheel 165 or the sun gear 160 of the first planetary transmission 148 (e.g., see FIG. 5B) to effectuate application of a primary torque along with an augmented torque.

Figure 6A:
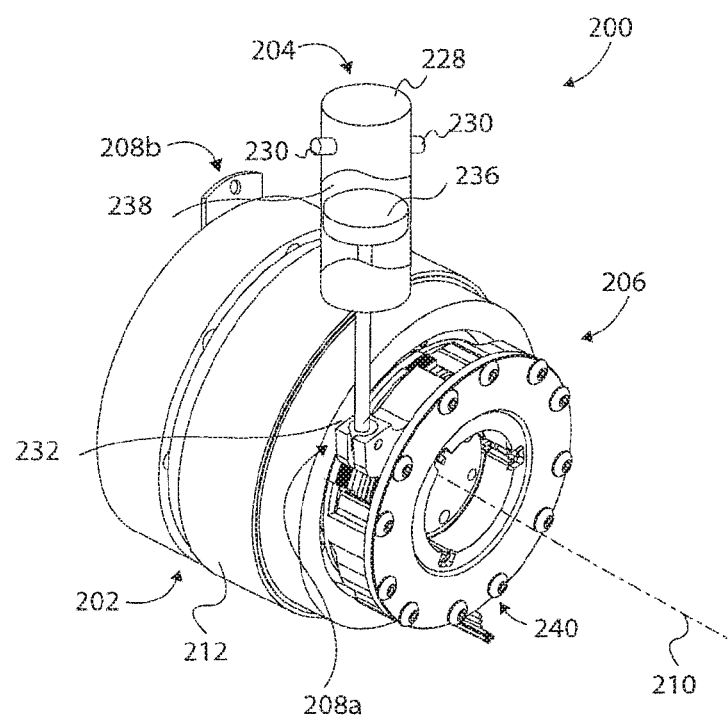
FIG. 6A is an isometric view of a clutched joint module in accordance with an example of the present disclosure.
Figure 6B:
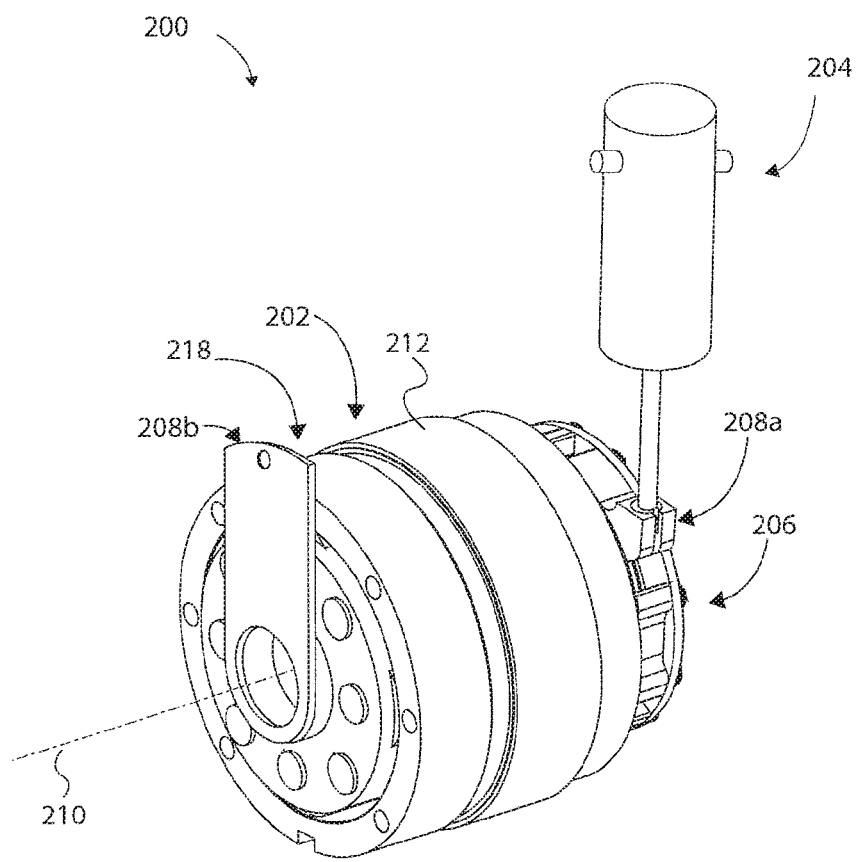
FIG. 6B is an isometric view of the clutched joint module of FIG. 6A from another perspective.
Figure 6C:
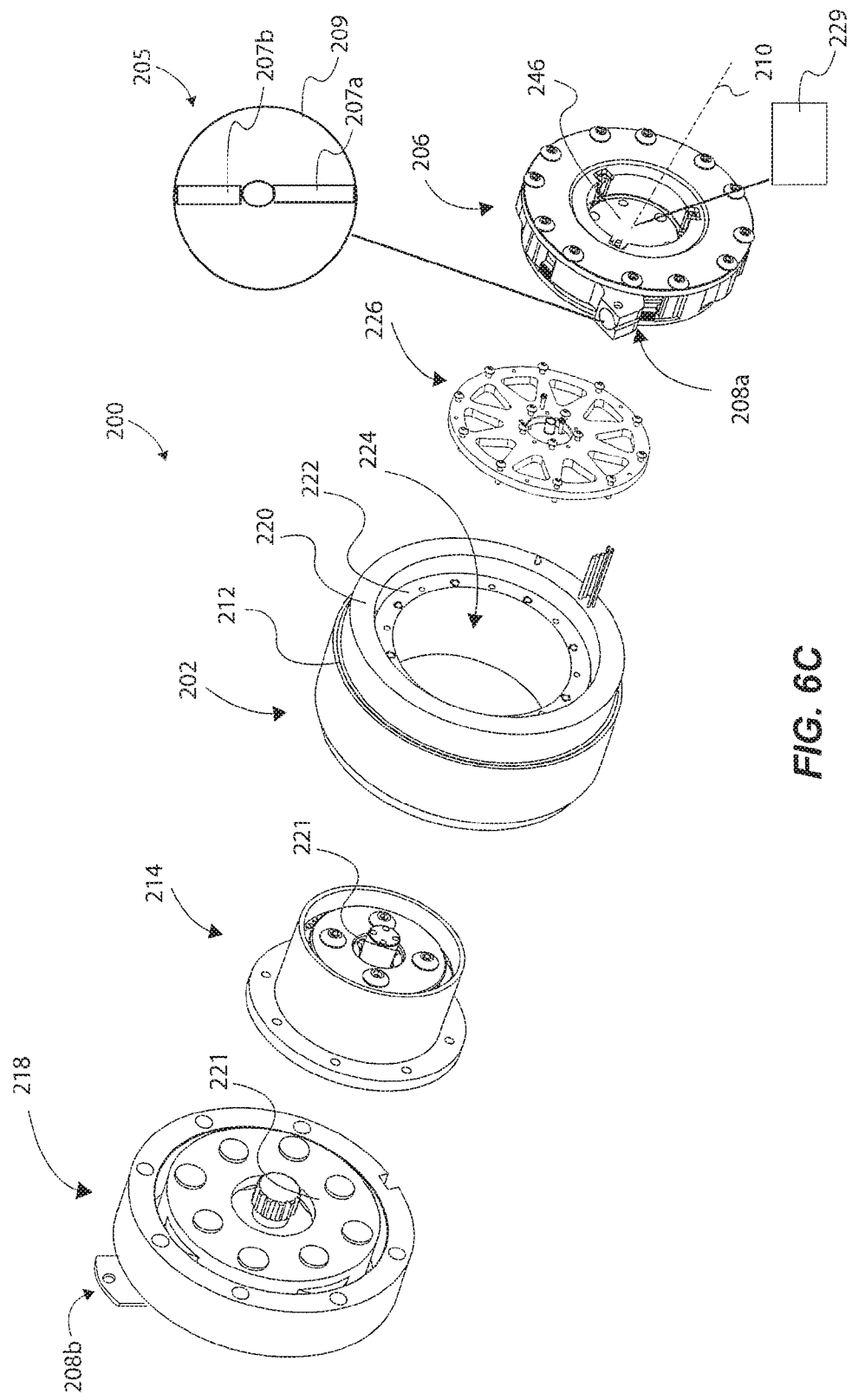
FIG. 6C is an exploded view of the clutched joint module of FIG. 6A.

With reference to FIG. 6C, the motor 212 can comprise a stator 220 and rotor 222 rotatable relative to each other (in a typical fashion for commercially available frameless brushless motors). Thus, the motor 212 of the primary actuator 202 comprises a cylindrical void 224 about the central area of the rotor 222. Advantageously, the first planetary transmission 214 can be positioned (at least partially) within the cylindrical void 224 of the motor 212, which provides a low-profile, compact geared motor configuration as the first planetary transmission 214 and the motor 212 are packaged together, as shown and described. A transfer wheel 226 can be coupled to the rotor 222 about the perimeter of the transfer wheel 226 via fasteners, and coupled to a sun gear 221 of the first planetary transmission 214, as also described above regarding FIG. 5B.

The motor 212, the first and second planetary transmissions 214 and 218, and the transfer wheel 226 can be the same or similar to, and can have the same or similar arrangement and functionality, as the like components described above regarding FIGS. 5A-5E. As such, these will not be described in greater detail regarding the clutched joint module 200 of FIGS. 6A-6G.

Figure 6D:
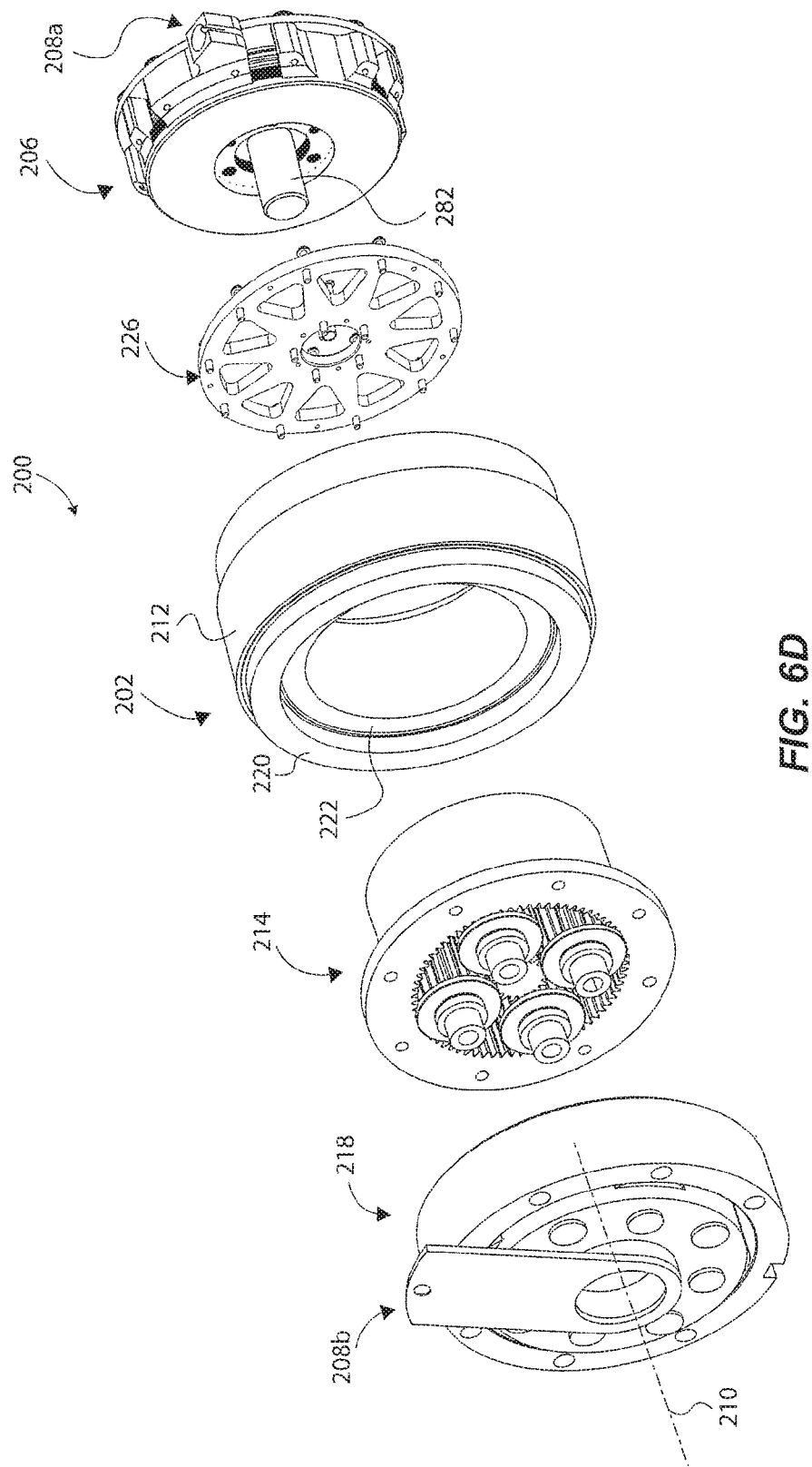
FIG. 6D is an exploded view of the clutched joint module of FIG. 6A from another perspective.
Figure 6E:
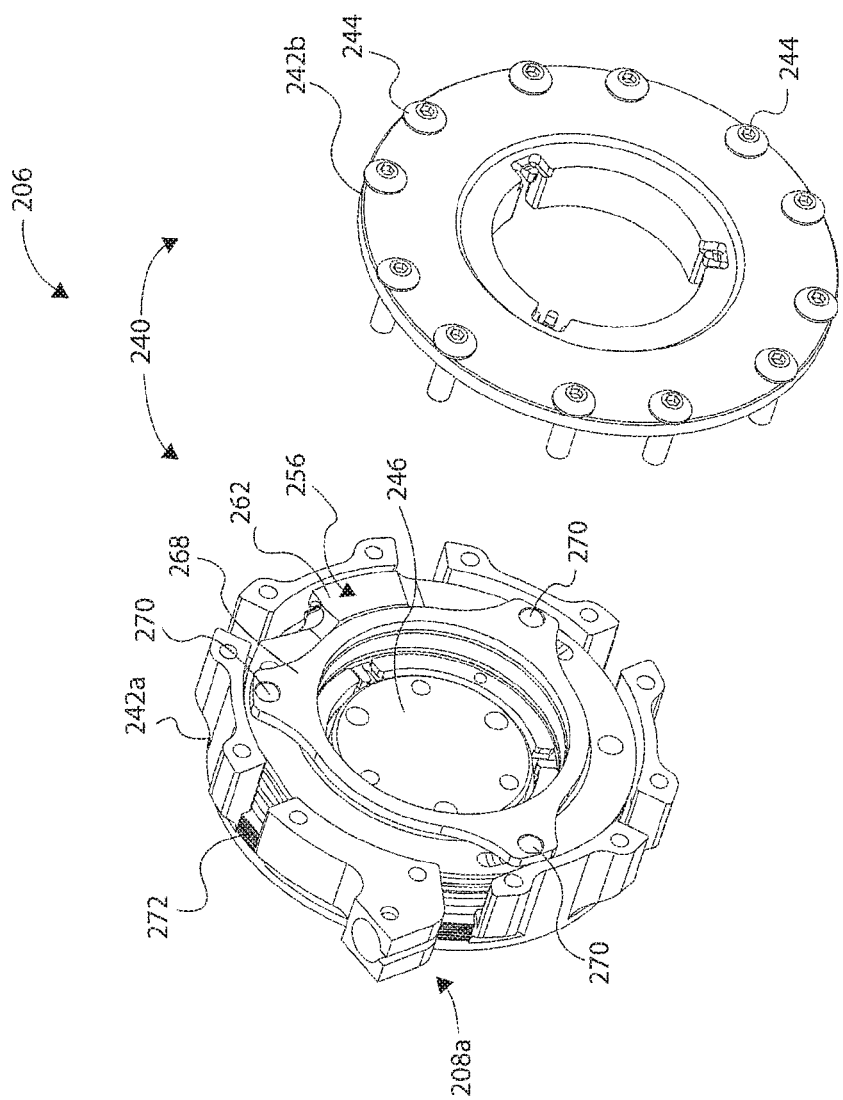
FIG. 6E is an exploded view of the clutch mechanism of the clutched joint module of FIG. 6A.

However, as can be appreciated from the arrangement shown in FIGS. 6D and 6E, the rotor 222 drives/rotates the transfer wheel 226, which drives/rotates the sun gear 221 of the first planetary transmission 214, which drives/rotates a sun gear 223 of the second planetary transmission 218, and which drives/rotates the output member 208b, thereby transferring the primary torque from the motor 212 to the output member 208b via a two-stage transmission drive system. This provides a 16:1 geared down torque output. As with the case of FIGS. 5A-5E, the motor 212, the first and second planetary transmissions 214 and 218, and the output member 208b can each operate or rotate about substantially the same axis of rotation as the axis of rotation 210 of the clutched joint module 200. Said another way, each axis of rotation of the motor 212, the first and second planetary transmissions 214 and 218, and the output member 208b, can be made to be collinear or substantially collinear with the axis of rotation 210.

Support frames, such as those described regarding FIG. 5A of U.S. patent application Ser. No. 15/810,102, filed Nov. 12, 2017, which is incorporated by reference in its entirely herein, can be utilized to house and structurally support the primary actuator 202, the secondary planetary transmission 218, and the clutch mechanism 206, of the present disclosure in a similar manner.

In the illustrated example of FIGS. 6A-6G, the output member 208b applies a relatively higher torque at a low speed with very little noise and backlash via the planetary transmissions 214 and 218, all in a compact form with the planetary transmission 214 being housed within the central void 224 of the motor 212, and because of the cascading arrangement of the motor 212 and the first and second planetary transmissions 214 and 218 all arranged along, and operating about or around, the axis of rotation 210.

With particular reference to FIGS. 6A, and similar to FIGS. 5A-5E, the quasi-passive elastic actuator 204 is operable to apply an augmented torque to rotate the output member 208b along with the primary torque applied by the motor 212 of the primary actuator 202. In one example, similar to FIG. 5B, the quasi-passive elastic actuator 204 can be a linear pneumatic spring comprising a housing 228 and a robotic support member interface 230 coupled to the housing 228 and pivotally coupleable to a robotic support member as part of a joint within a limb of the robot or robotic assembly (e.g., 105f of FIG. 4C). The robotic support member interface 230 can be one or two bearings, fasteners, or other coupling device(s) that can pivotally couple the housing 228 to such robotic support member.

As with FIGS. 5A-5E, the quasi-passive elastic actuator 202 of FIG. 6A can comprise a piston rod 232 pivotally coupled, on one end, to a coupling portion 234 of the clutch mechanism 206. On the other end, the piston rod 232 can be coupled to a piston cylinder 236 that is slidably supported within the housing 228. Accordingly, the housing 228 can comprise a compression gas chamber 238 adjacent the piston cylinder 236 and an expansion chamber, these being sealed off by the piston cylinder 236. As shown, the piston rod 232 can be pivotally coupled to the clutch mechanism 206 off-center relative to the axis 210. Accordingly, as further detailed below, and with the clutch mechanism engaged or semi-engaged to place the quasi-passive elastic actuator 204 in the elastic or semi-elastic state, upon movement of a robotic support member (e.g., 105f), the housing 228 can move downwardly, for instance, which causes the piston cylinder 236 to translate upwardly within the housing 228, which causes gas in the gas compression chamber 238 to compress, thereby storing energy within the quasi-passive elastic actuator 204, which energy can be released to apply an augmented torque as discussed above. This action can also be used to generate a braking force (i.e., compression of the elastic element generates a force that can be used to restrict movement of the output member relative to the input member). Furthermore, once stored, the energy can be dissipated (by disengaging the clutch mechanism 206) or released (by keeping the clutch mechanism 206 at least partially engaged) to apply an augmented torque that can be combined with a primary torque by the motor, as discussed herein. Note that only FIGS. 6A and 6B show the linear air spring for purposes of illustration clarity of the other Figures.

Alternatively, as shown in FIG. 6C, the linear air spring can be replaced with another elastic element, such as a rotary fluid spring 205 (schematically shown) comprising a rotor vane 207a and a stator vane 207b coupled to a housing 209 that define a compression chamber and an expansion chamber. The rotor vane 207a can be coupled to an input device, such as a robotic support member, such that a first rotation of the robotic support member causes rotation of the rotor vane 207a relative to the stator vane 207b, thereby storing energy in the compression chamber in the form of fluid pressure (e.g., liquid or gas). And, upon a second rotation of the robotic support member, the rotor vane 207a moves in the opposite rotational direction relative to the stator vane 207b, thereby releasing stored energy to apply an augmented torque to the input member 208a associated with the clutch mechanism 206. The rotary fluid spring 205 can have the same or similar features as the linear actuators described herein (e.g., 134, 204), such as being tunable by modifying the pre-charge fluid pressure in the compression and expansion chambers, having elastic, semi-elastic and inelastic states, and being selectively and variably controlled, rotary fluid spring configured in this manner can store and release more energy than a comparable linear spring actuator, which may be advantageous for certain joints that can benefit from such features, such as the hip and knee joints. The rotary fluid spring 205 can further be operable with a valve assembly capable of controlling in real-time the actuation of the rotary fluid spring 205, and for facilitating selective switching between the elastic, semi-elastic and inelastic states of the rotary fluid spring 205. The valve assembly can define a shunt circuit for the flow of the fluid between the compression and expansion chambers and a movable valve device of the valve assembly that controls the opening and the closing of the valve.

Generally, the quasi-passive elastic actuator 204 is switchable between an elastic configuration or state (including a semi-elastic state) (i.e., storing or releasing energy) and an inelastic configuration or state (i.e., neither storing nor releasing energy) via operation of the clutch mechanism 206 for selectively controlling application of the augmented torque applied by the quasi-passive elastic actuator 204. In one example, with reference to FIGS. 6E-6G, the clutch mechanism 206 can comprise a multi-plate clutch mechanism comprising a clutch housing 240 that includes a first support frame 242a and a second support frame 242b coupled together via fasteners 244 (FIG. 6E). A transfer component 246 is rotatably supported and surrounded by a partition plate 248 (FIG. 6F), which can be coupled to the second support frame 242b by corresponding slots or fasteners. A roller bearing device 250 comprises a plurality of roller bearings 252 that rotatably interface to the partition plate 248. A ball-ramp clutch device 254 comprises a rotatable ball ramp frame 256 and a spring collar 258 coupled to an inner area of the ball ramp frame 256. The ball ramp frame 256 comprises three ball ramp recesses 260 formed around the perimeter of the ball ramp frame 256. The ball ramp frame 256 comprises a cable interface 262 that couples the ball ramp frame 256 to an actuator 264 via a cable 266. The cable 266 can traverse along a slot formed around the perimeter of the ball ramp frame 256. A ball support frame 268 can be disposed adjacent the ball ramp frame 256, and can comprises a plurality of balls (e.g., see three balls 270) rotatably support by the ball support frame 268. One side surface of each ball 270 can be biased to an inner surface of the second support frame 242b, and the other side surface of the balls 270 can be slidably and rotatably interfaced about the ball ramp recesses 260 of the ball ramp frame 256.

Figure 6F:
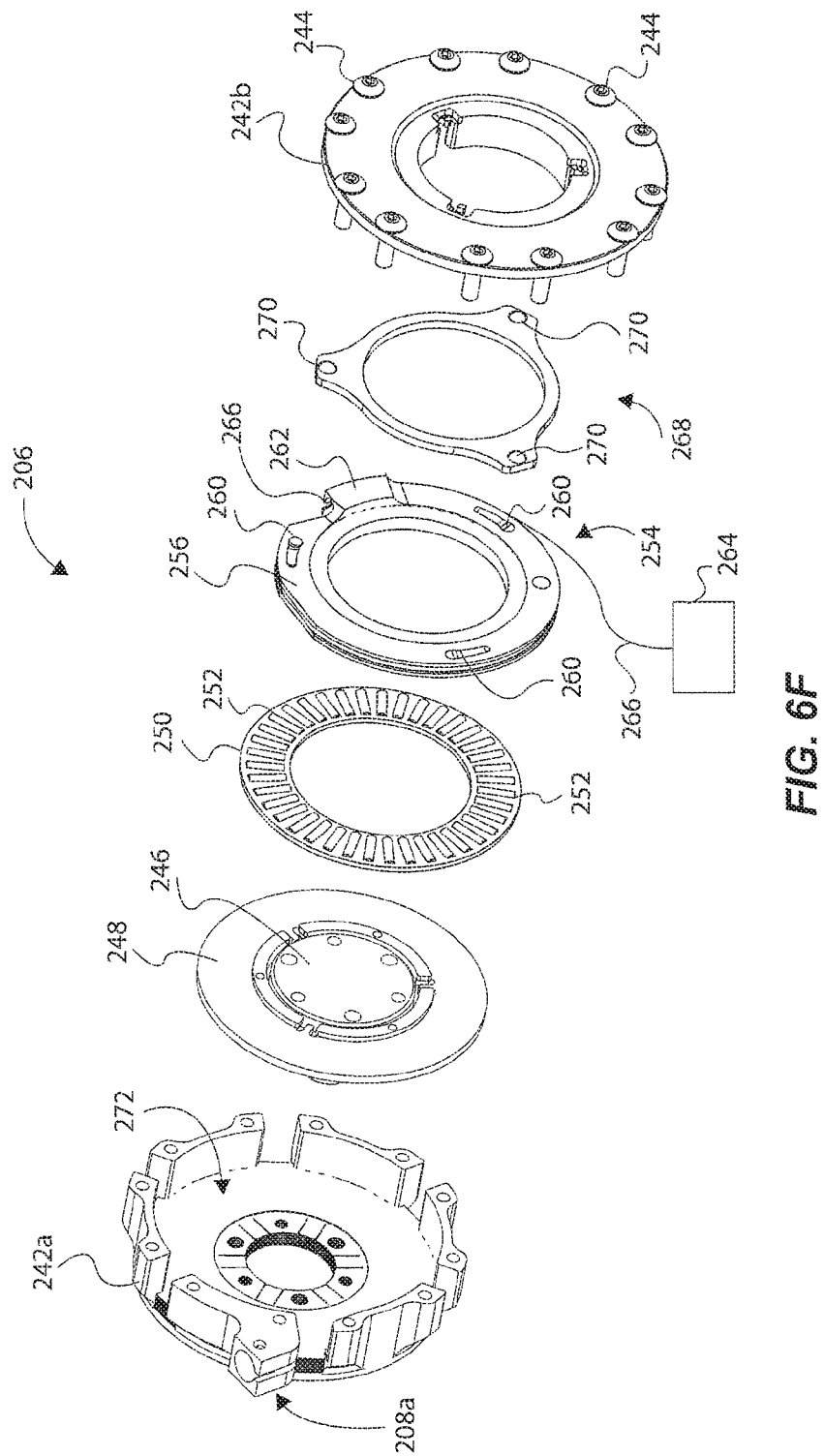
FIG. 6F is an exploded view of the clutch mechanism of the clutched joint module of FIG. 6A.

The spring collar 258, in a nominal state, can be configured to exert a rotational biasing force in the counter clockwise direction (FIG. 6F) against the ball ramp frame 256, which seats the balls 270 in respective deep pockets of the ball ramp recesses 260, thereby placing the clutch mechanism 206 in the disengaged state (see the below discussion regarding compressing and un-compressing the plates). The actuator 264 can comprise an electric motor having a receiver in communication with a controller (wired or wirelessly) of a computer system that controls operation of the clutch mechanism 206 via the actuator 264. Upon receiving a clutch control signal, the actuator 264 (e.g., electric motor) can operate to pull on the cable 266, which rotates the ball ramp frame 256 in the clockwise direction (FIG. 6F). This causes the ball ramp recesses 260 to move clockwise relative to the seated balls 270. Because the ball ramp recesses 260 are formed from deep pockets to shallow pockets along their profiles, the clockwise rotation of the ball ramp frame 256 results with seating the balls 270 in the shallow pocket areas of the ball ramp recesses 260. This tends to "increase the thickness" (or axial area consumed) of the ball ramp frame 256, which causes an axial biasing force from the ball ramp frame 256 against the collar bearing device 250, which causes an axial biasing force against the partition plate 248, which thereby causes an axial biasing force against a plurality of plates 272 to compress the plates 272 together.

Figure 6G:
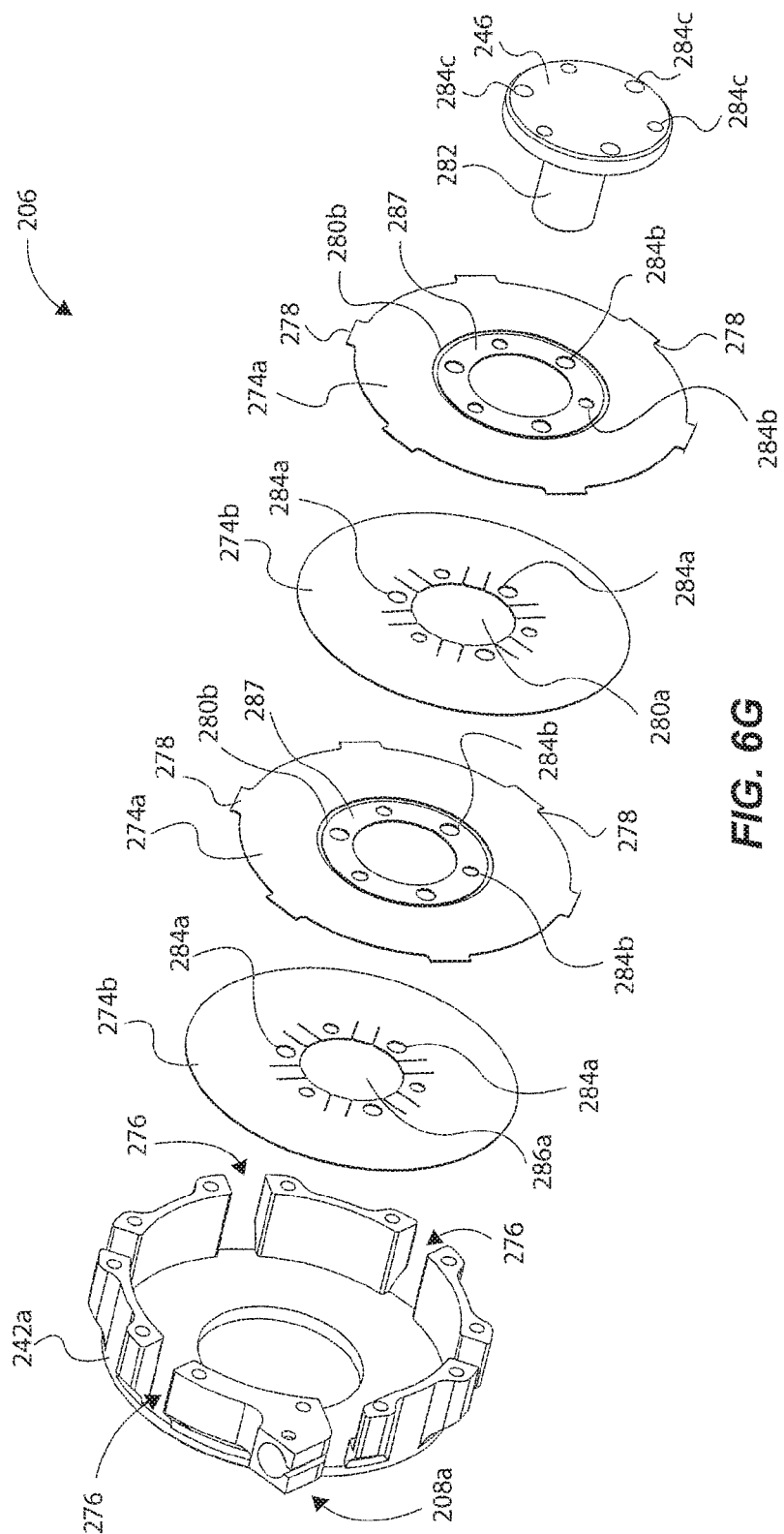
FIG. 6G is an exploded view of a portion of the clutch mechanism of the clutched joint module of FIG. 6A.

With particular reference to FIG. 6G, which configuration is similar to that shown in FIG. 5E and described above, the plurality of plates 272 comprises a plurality of input plates 274a retained and supported by the first support frame 242a of the clutch housing 240. Note that only two input plates are shown on FIG. 6G for illustration clarity, but more than two plates are possible. Accordingly, the first support frame 242a can comprise perimeter retaining features 276 (e.g., slots or recesses) that receive and retain perimeter flanges 278 of each of the input plates 274a to restrict movement of the input plates 274a relative to the clutch housing 240. A plurality of output plates 274b (two shown) can each be slidably or frictionally interfaced with (i.e., sandwiched between) adjacent input plates 274a, for example in an alternating manner. The output plates 274b can each have a curvilinear perimeter that is slidably supported within curved inner surfaces of the support frame 242a of the clutch housing 240. Each output plate 274b can comprise a central aperture 280a that allows passage of a shaft 282 of the transfer component 246, and each output plate 274b can comprise openings 284a (e.g., six total) formed around the central aperture 280a.

Each input plate 274a can comprise a central aperture 280b that rotatably supports a central support ring 287 disposed about the central aperture 280b, and each central support ring 287 can comprise openings 284b (e.g., six total) formed around the support ring 287 at locations corresponding to the openings 284a of each output plate 274a. The transfer shaft component 246 comprises openings 284c (e.g., six total) formed around the perimeter of a head of the transfer component 246 at locations corresponding to openings 284a and 284b. Accordingly, the transfer component 246 can be coupled to each of the output plates 274b and the support rings 287 via fasteners (not shown) such as pins, nuts and bolts, threaded fasteners, etc.

The shaft 282 of the transfer component 246 can be coupled to the sun gear 221 of the first planetary transmission 214 (and through the central opening of the transfer wheel 226). Therefore, when the clutch mechanism 206 is in the disengaged state, the ball-ramp device 256 does not exert an axial biasing force against the plurality of plates 272. Thus, the input and output plates 274a and 274b freely rotate relative to each other, such that the input member 208a freely rotates relative to the output member 208b (but with some minor resistance due to the planetary transmissions 214 and 218 coupled between the input and output members 208a and 208b). Accordingly, the quasi-passive elastic actuator 204 is caused to be in the inelastic state because of the rotational freedom between the input and output plates 274a and 274b, and thus, the quasi-passive elastic actuator 204 does not store or release energy. This rotational movement of the input member 208a relative to the output member 208b, where the joint module 200 is in free swing mode, can occur during a portion of a gait cycle (e.g., from points from C, D, E, F, and A of FIG. 2), such as in examples where the joint module 200 is integrated with a lower body exoskeleton as one of the joints of the exoskeleton.

When the clutch mechanism 206 is actuated to the engaged state (as explained above), the ball-ramp device 256 exerts an axial biasing force against the adjacent input plate 274a, which causes compression force between the output plates 274b and the adjacent input plates 274a. Such compression causes the plurality of plates 272 to "bind up" together (i.e., to rotate together in the same speed/direction). Thus, upon a first rotation of the input member 208a relative to the output member 208b, for example, when the input member 208a moves in a clockwise direction (FIG. 6C), the quasi-passive elastic actuator 204 stores energy about the compression gas chamber 238 (FIG. 6A) by virtue of upward movement of the piston cylinder 232 through the housing 228 (such first rotation can be during a shoulder joint movement, or movement of a lower exoskeleton joint (e.g., a knee joint) during a portion of a gait cycle, such as from point B to C of FIG. 2). And, upon a second rotation of the input member 208a (e.g., a counter shoulder joint movement, or movement of a lower exoskeleton joint during another portion of a gait cycle, such as from point A to B of FIG. 2), such that the input member 208 moves counter clockwise, the quasi-passive elastic actuator 204 can be caused to release its stored energy to apply an augmented torque to rotate the clutch housing 240, which drives/rotates the plurality of plates 272, which drives/rotates the transfer shaft component 246, which drives/rotates the sun gear of the first planetary transmission 214, which drives/rotates the second planetary transmission 218, and which ultimately transfers the augmented torque to the output member 208b. In one example, only two plates may be utilized in the clutched, that is, only one input plate 274a and one output plate 274b can be frictionally engaged to each other and configured to provide the clutch function discussed herein. This is not intended to be limiting in any way. Indeed, any number of additional input and output plates can be incorporated to account for larger torques that may be transferred via the clutch plates when the clutch is engaged. These same alternatives are true for the plates of the example of FIGS. 5A-5E (e.g., just two plates, or any number of additional plates).

Concurrently, upon receiving a primary control signal, the rotor 220 of the primary actuator (e.g., motor 212) exerts a primary torque to drive/rotate the transfer wheel 226, which drives/rotates the sun gear 221 of the first planetary transmission 214, which drives/rotates the second planetary transmission 218, and which ultimately transfers said primary torque to the output member 208b, along with the augmented torque concurrently applied via the quasi-passive elastic actuator 204, to actuate a shoulder joint module of an exoskeleton, for instance. This can dramatically reduce the size and power requirements of the motor 212 that would otherwise be needed because the total output torque of the joint module 200 is supplemented with augmented torque recovered via the quasi-passive elastic actuator 204. Note that the quasi-passive elastic actuator 204 can have the same or similar features and advantages discussed above with reference to the clutched joint module shown in FIGS. 5A-5E. As can be seen, and as discussed above, the quasi-passive elastic actuator can be caused to switch between the elastic and inelastic states as needed or desired.

Each of the rotational movements (discussed above) of the input member 208a relative to the output member 208b (e.g., of a robotic joint) whether the clutch mechanism 206 is engaged or disengaged, and the quasi-passive elastic actuator in a respective elastic or an inelastic state, can be sensed by one or more position and/or force sensors 229 (FIG. 6C) associated with and/or coupled to the joint module 200 to sense a direction, speed, and/or force associated with rotation of the joint module 200. The one or more sensors can be coupled at various locations, such as a frame support of the joint module 200, at the input member 208a or output member 208b, at the transfer wheel 226, or any other suitable locations of the joint module 200, or any combination of these. In one example, a particular position sensor (e.g., Hall effect sensor) can determine a relative position of the input member 208a, and, upon the second rotation (as discussed above), the position sensor can communicate a position signal to a computer system, having a central processing unit, that processes the position signal, and then ultimately transmits an appropriate clutch signal to the clutch actuator 264 to engage (or maintain engagement of) the clutch mechanism 206 (for instance), or to transmit a primary actuator signal to the motor 212 to apply the primary torque, as discussed further herein, or some combination of these.

In one example, the clutch mechanism 206 can be arranged such as is shown in FIG. 5A, whereby the clutch mechanism 136 of FIG. 5A is replaced with clutch mechanism 206. In this manner, the augmented torque that would be applied by the quasi-passive elastic actuator 204 would be a 1:1 drive ratio (i.e., it would not be geared down by 16:1, as with FIGS. 6A-6F). As indicated above, in another example configuration of the clutched joint module 200, the quasi-passive elastic actuator 204 may be optional (i.e., not included in or part of the clutched joint module 200, or rather the clutched joint module 200 is configured without a quasi-passive elastic actuator). For instance, a joint (e.g., one associated with wrist rotation, or shoulder abduction/adduction, may only be configured with an active actuator (i.e., a primary actuator as discussed herein, even though the term "primary" suggests that another torque generating element exists) and without an elastic element. Accordingly, an input member or robotic support member can be directly coupled to the clutch housing 240 rather than to a quasi-passive elastic actuator, such as at an off center position. In this configuration, the clutch mechanism 206 can still be selectively operated between the engaged state, the semi-engaged state and the disengaged state to control and restrict movement between the output and input members 208a and 208b. Indeed, in one aspect, the clutched mechanism 136 can be engaged or semi-engaged to restrict movement between the output and input members 138a and 138b, thereby facilitating application of the primary torque to the output member by the motor 212. In this manner, the actuator 264 can be variably controlled to variably move the ball ramp device 256 to apply a variable compression force to the plates 274 and 274b, which can provide a braking function and/or gravity assist control function.

It is noted that the various functions and operational states described above with respect to the clutched joint module 130 are applicable to the clutched joint module 200. As such, these are not described again here, but those skilled in the art will recognize that upon reading the description above as it pertains to FIGS. 5A-5E, that the clutched joint module 200 can be operated in the same or a similar manner.

Figure 7A:
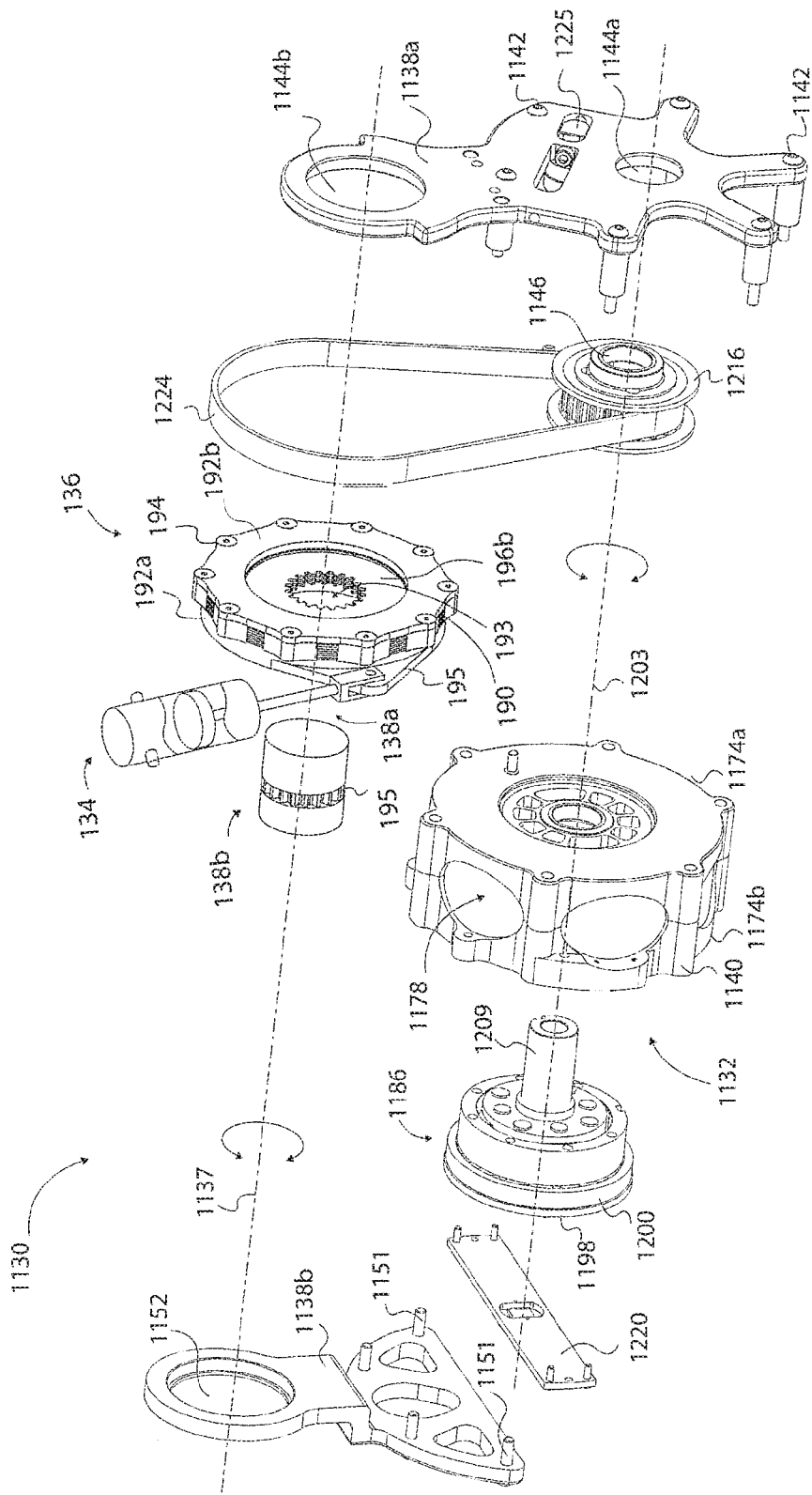
FIG. 7A is an exploded view of a clutched joint module in accordance with an example of the present disclosure, having the clutch mechanism and quasi-passive elastic actuator of FIG. 5A-5E located about an axis offset from an axis of the primary actuator and coupled to the primary actuator via a torque-transferring device.
Figure 7B:
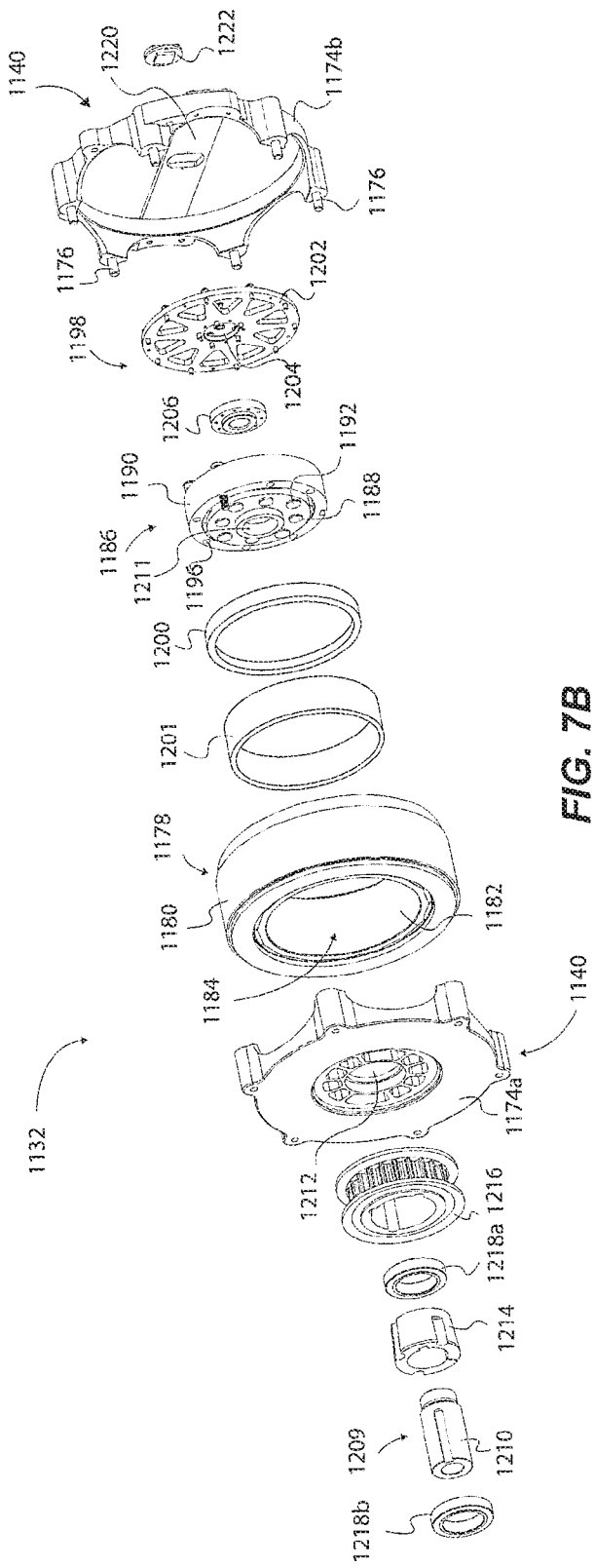
FIG. 7B is an exploded view of the primary actuator of the clutched joint module of FIG. 7A.

FIG. 7A illustrates a clutched joint module 1130 in accordance with an example of the present disclosure, and FIG. 7B illustrates a primary actuator of the clutched actuator module 1130. The clutched actuator joint module 1130 can comprise the clutch mechanism 136 and the quasi-passive elastic actuator 134 described with reference to FIGS. 5A-5E positioned off-axis relative to an axis of rotation 1203 of a primary actuator 1132. That is, an axis of rotation 1137 of the clutch mechanism 136 can be generally parallel to, but offset from, the axis of rotation 1203 of the primary actuator 1132. Here, the output shaft 138b can be coupled to a torque-transfer device, such as a transmission belt 1224, via a splined ring gear (not shown) fastened or formed as part of the right end of the output shaft 138b. Alternatively, the splined ring gear can be coupled to the second support frame 192b of the clutch mechanism 136. In either scenario, a torque-transfer device, in this case a transmission belt 244, can transfer a torque to the output shaft 138b to actuate rotation within the clutched joint module 1130. Although not shown to scale, the left end of the output shaft 138b can be rotatably interfaced to and through an aperture 1152 of a support frame 1138b, and then can be coupled to an output member that is coupled to a robotic support member, or it can be coupled directly to the robotic support member. Thus, as further detailed above regarding FIGS. 5A-5E, rotation of the input member 138a via the quasi-elastic actuator 134 causes rotation of the output shaft 138b (when the clutch is engaged) to actuate the clutched joint module 1130.

More specifically regarding this alternative configuration, the primary actuator 1132 (e.g., a geared electric motor) can be configured and operable to apply a torque to the output member 138b for rotation about the axis of rotation 1137, and the quasi-passive elastic actuator 134 (e.g., a linear or rotary pneumatic actuator) can be selectively operable (via operation of the clutch) to apply an augmented torque to the output member 138b along with the torque applied by the primary actuator 1132 to reduce the power required to actuate rotation of the joint module, such as during a certain portion of a gait cycle by an exoskeleton (or other movement of an exoskeleton limb, such as the an upper body movement).

The clutch mechanism 136 can be structurally mounted to the primary actuator 1132 by a first mounting plate 1138a and a second mounting plate 1138b, each positioned on either side so as to constrain the primary actuator 1132 and the clutch mechanism 136 in a "sandwich" state. Although not shown here, the first and second housings 192a and 192b of the clutch mechanism 136 can have support members extending outwardly therefrom and that support annular collar bearings that rotatably couple and support the clutch mechanism 136 to the first and second mounting plates 1138a and 1138b. Other suitable means of rotatably coupling the clutch mechanism 136 to the support plates are possible as will be recognized by those skilled in the art.

The first mounting plate 1138a can be mounted to a housing mount 1140 (that supports the primary actuator 1132) via a plurality of fasteners 1142 (with spacers there between). The second mounting plate 1138b can be mounted to the other side of the housing mount 1140 via a plurality of fasteners 1151.

The output shaft 138b (and/or an output member coupled to the shaft 138b) can be a load transfer component that can comprise many different shapes and forms, depending upon the particular type of robotic system and its application (e.g., exoskeleton, humanoid robot, robotic hand or arm). As such, the specific configurations shown are not intended to be limiting in any way. The output member 136b can comprise a robotic support member interface portion coupleable to a support structure of a robotic assembly, such as the exoskeleton of FIG. 4A.

The housing mount 1140 can comprise a first mount structure 1174a and a second mount structure 1174b coupled to each other via fasteners. The first and second mount structures 1174a and 1174b can be fastened together to house and structurally support many of the components of the primary actuator 1132. For instance, the primary actuator 1132 can comprise a motor 1178 (e.g., electric motor) that is seated in the first and second mount structures 1174a and 1174b. The motor 1178 can be a high-performance Permanent Magnet Brushless DC motor (PM-BLDC). The motor described above and shown in the drawings is not intended to be limiting in any way. Indeed, other motors suitable for use as the primary actuator 1132 are contemplated herein, as are various other types of actuators, such as hydraulic or pneumatic actuators.

As further shown in FIG. 7B, the motor 1178 can comprise a stator 1180 and rotor 1182 rotatable relative to each other (in a typical fashion for commercially available frameless brushless motors). Note that the view of FIG. 7B is rotated relative to the view initially shown in FIG. 7A of the primary actuator 1132. The motor 1178 can be configured to comprise a central void 1184 about the central area of the motor 1178 and surrounded by the rotor 1182. Advantageously, a transmission, such as a planetary transmission 1186 (or any other type of transmission), can be positioned within (entirely or partially) the central void 1184. This provides a low-profile geared motor state with high torque output for a relatively small electric motor, as exemplified elsewhere herein. It should be appreciated that the planetary transmissions exemplified herein can be replaced (or supplemented with) other transmission types, such as harmonic, cycloidal, worm, belt/chain, crank, four-bar linkage, backhoe linkage, bell crank, and continuously variable, for instance.

In the present example the planetary transmission 1186 can be configured as a 4:1 geared planetary transmission. Thus, in one example the planetary transmission 1186 can comprise an outer ring 1190 engaged to four planet gears 1188 (one labeled) mounted about a carrier 1192, whereby the four planet gears 1188 have gear teeth that engage with the gear teeth of a central sun gear (not visible from this view). In the present example, the outer ring 1190 is stationary, as it is fastened to the first mount structure 1174*a* via fasteners (not shown) through apertures around the outer ring 1190 and into threaded bores in the first mount structure 1174*a*. A rotatable transfer wheel 1198 is disposed on an outer side of the primary actuator 1132 adjacent the second mount structure 1174*b*, and is fastened to a drive collar 1200 via perimeter fasteners. The drive collar 1200 is fastened or fixed to the rotor 1182 of the motor 1178. The transfer wheel 1198 is operable to transfer rotation from the rotor 1182 of the motor 1178 to the sun gear (of transmission 1186) about the axis of rotation 1203 (FIG. 7A). A spacer sleeve 1201 can be positioned adjacent the drive collar 1200 and between the outer ring 1190 of the planetary transmission 1186 and the rotor 1182 to act as a support spacer between the planetary transmission 1186 and the rotor 1182.

The transfer wheel 1198 can comprise a central aperture 1204 that supports a transfer hub 1206 that is fastened to the transfer wheel 1198 via fasteners. The transfer hub 1206 can have inner gear teeth (not shown) that can be engaged with outer gear teeth of the sun gear. Therefore, upon applying an electric field to the motor 1178, the rotor 1182 rotates about axis 1203, which causes the transfer wheel 1198 to rotate, which thereby causes the sun gear 1194 to rotate, all in a 1:1 ratio. Upon rotation of the sun gear about axis of rotation 1203, the planetary gears 1188 rotate around the sun gear, which causes the carrier 1192 to rotate. An output shaft 1209 is secured to a central portion 1211 of the carrier 1192, such that rotation of the carrier 1192 causes rotation of the output shaft 1209 about axis 1203, which provides a 4:1 geareddown transmission arrangement from rotation of the rotor 1182 to the output shaft 1209 via the planetary transmission 1186. Other planetary transmission types and gear reduction schemes can be used instead of a 4:1 transmission, such as a 3:1 or a 5:1 (or even greater ratios) planetary gear scheme.

To reduce build height, the planetary transmission 1186 can be positioned inside of the rotor 1182 of the motor 1178. Depending on the motor selected, the inside diameter of the rotor will dictate the maximum outside diameter of the planetary transmission. Once the planetary ring has been constrained by its outside diameter, there are a limited amount of options for gear ratios and output torques available. The output ratio is determined from the ratio of the number of teeth on the ring gear to the number of teeth on the sun gear. To obtain a higher reduction in the compact design of the planetary unit, the sun gear diameter can be reduced, which generally corresponds to less power transmission. The capacity to transmit higher torques is reduced with a smaller sun gear. A balance of reduction and strength can be determined for a planetary unit that will physically fit inside the motor rotor. By implementing a helical cut gear, higher forces can be transmitted on the gear teeth making the unit stronger. A wider tooth will also improve the load carrying capacity of the sun gear, however this increases the weight as well.

In addition, the sun gear makes contact with several teeth simultaneously so the contact ratio is much higher than a conventional spur gear transmission. Another benefit of planetary gears is the fact that the transmission is in-line with the motor, which allows for compact mounting states. Two of the 4:1 planetary units can be nested together to produce a 16:1 final drive, for instance.

Thus, in one example using Allied Motion's MF0127-032 motor, it has an inside diameter of 3.3 inches, which means that a planetary transmission of approximately 3.15 inches (or less) could be used and disposed in the central void of the motor. And, Matex's 75-4MLG12 planetary transmission can be incorporated, which is a 4:1 unit with a 2.95 inch outside diameter having a 118 N-m peak torque, weighing just 500 grams. Such planetary transmission could be incorporated with a brushless motor as discussed herein to generate a compact configuration. Therefore, in the illustrated example of FIG. 7B, the output shaft 1209 applies a relatively higher torque at a low speed with very little noise and backlash via the planetary transmission 1186, all in a compact form because the planetary transmission 1186 is housed within the void 1184 of the brushless frameless electric motor 1178. It is noted that the specific types of motors and planetary transmissions described herein are not intended to be limiting in any way, as will be recognized by those skilled in the art.

With continued reference to FIGS. 7A and 7B a free end 1219 of the output shaft 1192 extends through an aperture 1212 of the first mount structure 1174*a*. A tapered support collar 1214 surrounds and is coupled to the output shaft 1192 (a key and slot interface can be used to couple the support collar 1214 to the output shaft 1192). The tapered support collar 1214 has an outer tapered surface that mates to an inner tapered surface of a primary pulley 1216 (e.g., such as a Morse taper interface) to couple the output shaft 1192 to the primary pulley 1216 (a key and slot interface can be used to couple the support collar 1214 to the primary pulley 1216). A first collar bearing can be positioned within the aperture 1212 (FIG. 7A) of the first mount structure 1174*a* to rotatably support the output shaft 1192, and a second collar bearing 218*b* can be positioned with an outer end of the primary pulley 1216 to rotatably support the free end 1210 of the output shaft 1192.

In one example, a sensor plate 1220 can be fastened to an outer side of the second mount structure 1174*b*, the sensor plate 1220 comprising an aperture that supports a position sensor 1222. The position sensor 1222 can be adjacent the transfer wheel 1198, which has an aperture through to the sun gear 1194 to allow the position sensor 1222 to determine the position of the sun gear 1194, which can ultimately determine the rotational position of the output shaft 1209, thereby providing the angular position of a knee or hip joint, for instance. The position sensor 1222 can be any suitable sensor, such as a 13-bit hall-effect sensor. Additional positions sensors can be coupled to the system, and utilized to ultimately determine the position of the joint. The particular position of a robotic joint is relevant in determining and controlling actuation of the clutch mechanism to switch the quasi-passive elastic actuator between the inelastic, semielastic and elastic states, or to dynamically vary a zero point or position of the elastic actuator.

Upon rotation of the output shaft 1209 (in either rotational direction) by operating the motor 1178, the primary pulley 1216 rotates the transmission belt 1224 that is coupled to the output shaft 138*b* (or to the clutch mechanism 136), as discussed above, to provide a primary torque to rotate the output shaft 138*b* to actuate a robotic joint, for instance. The transmission belt 1224 can be a Gates Poly Chain GT Carbon synchronous belt, or other suitable belt. A belt tensioning device 1225 (FIG. 7A) can be adjustably slidably coupled to a slot of the first mounting plate 1138*a* via a fastener, which is operable by a user with a tool to slide the belt tensioning device 1225 toward or away from the belt 1224 to tighten or loosen the belt 1224, as desired. In some examples, various other torque-transmitting devices can replace the particular configuration of the belt 1224, such as one or more belts or linkages or gears or tendons (or combinations of such). Moreover, the transmission(s) can be arranged to have an axis of rotation that is offset (e.g., oriented in a direction along a plane that is orthogonal or at some other angle) from the axis of rotation 1203 of the primary actuator 1132 (some other position other than collinear). And, various transmissions can be arranged to provide different gear reductions from input to output, including a relatively high gear reduction (e.g., 20:1, or more), or a relatively low gear reduction (e.g., 1:1), or any gear reduction between these, depending on the particular application. In some examples, the torque-transmitting device in the form of belt 1224, or such various alternative torque-transmitting devices, can allow the primary actuator 1132 to be remotely located away from the output (i.e., the primary actuator 1132 is located a given distance away from the output of the clutched joint module, but operably connected thereto via the torque-transmitting device), wherein the remotely located primary actuator 1132 can be actuated and its torque transferred to the output of the tunable actuatable joint module corresponding to a joint of the robotic system. For instance, the primary actuator 1132 could be located at a lower back area of an exoskeleton (e.g., FIG. 4A), while such alternative torque-transmitting device(s) could transfer the primary toque from the lower back area to an output member located in the clutched actuator joint module for the hip joint for actuating the hip joint.

It should be appreciated that the clutch mechanism 206 and the quasi-passive elastic actuator(s) 204 or 205 discussed regarding FIGS. 6A-6B could readily replace the clutch mechanism 136 and quasi-passive elastic actuator 134 of FIG. 7A, and can be mounted to the mounting plates in a similar or different manner and can be operatively coupled to the primary actuator 1132 via a transmission belt (or other transmission) in a similar way as described regarding FIGS. 7A and 7B.

In some examples, as shown herein, the quasi-passive elastic actuators can comprise linear pneumatic actuators (e.g., 134, 204), but each of these can be replaced with other elastic elements, such as rotational springs (e.g., torsional springs), rotary pneumatic springs, coil springs, leaf springs, and the like. Such quasi-passive elastic actuators contemplated herein can be comprised of metal, composite, polymer, rubber, etc. In some examples, additional linkages or pivoting support members can be coupled between a particular quasi-passive elastic actuator and a particular input and/or output member, which can reduce packaging size (e.g., remotely locate the quasi-passive elastic actuators away from the joint), as well as take advantage of torque output versus the position at which the quasi-passive elastic actuator is coupled to the output member.

It should be appreciated that the planetary transmissions exemplified herein can be replaced (or supplemented with) other transmission types, such as harmonic, cycloidal, worm, belt/chain, crank, four-bar linkage, backhoe linkage, bell crank, and continuously variable, for instance. And, various torque-transmitting devices can be operatively coupled between the planetary transmissions (and alternative transmissions discussed), such as one or more belts or linkages or gears or tendons (or combinations of such).

It is noted that the various functions and operational states described above with respect to the clutched joint module 130 are applicable to the clutched joint module 1130. As such, these are not described again here, but those skilled in the art will recognize that upon reading the description above as it pertains to FIGS. 5A-5E, that the clutched joint module 1130 can be operated in the same or a similar manner.

It is further noted that rotation of the joints (i.e., relative rotation between the input and output members) defined by the various clutched joint modules discussed herein can be in any direction (e.g., the same direction, different directions) during the storing and releasing of the energy, during the generation and application of a braking force, as well as the disengagement of the clutch mechanism to facilitate free swing of the joint. In other words, the clutch mechanism can be operated to engage to store energy, to release energy, or to disengage to facilitate free swing of the joint upon rotation of an associated joint in the same direction or in various different directions. This is the case for all of the examples set forth in the present disclosure.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one example" or "an example" means that a particular feature, structure, or characteristic described in connection with the example is included in at least one embodiment of the present invention. Thus, appearances of the phrases "in one example" or "in an example" in various places throughout this specification are not necessarily all referring to the same embodiment.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A clutched joint module for use within a robotic assembly, comprising:
   an output member operable to couple to a first support member of a robotic system;

an input member operable to couple to a second support member of the robotic system;

a primary actuator operable to apply a torque to rotate the output member about an axis of rotation, the primary actuator comprising a motor and a first transmission operatively coupled between the motor and the output member, wherein the first transmission is at least partially disposed within a central void of the motor; and a clutch mechanism operably coupled between the input member and the output member, the clutch mechanism operable in an engaged state, a semi-engaged state, or a disengaged state, wherein the engaged state and the semi-engaged state facilitate selective application of the primary torque to the output member, wherein the clutch mechanism and the primary actuator each have a central axis of rotation substantially parallel to each other.

2. The clutched joint module of claim 1, wherein the clutch mechanism is operable in the engaged or semi-engaged state to generate a braking force for restricting rotation between the input and output members either with or without the primary torque.

3. The clutched joint module of claim 1, wherein the clutch mechanism comprises a plurality of plates and an actuator operable to compress the plurality of plates to cause the clutch mechanism to function in the engaged state or the semi-engaged state.

4. The clutched joint module of claim 1, wherein at least a portion of the clutch mechanism comprises a clutch axis of rotation substantially collinear with the axis of rotation.

5. The clutched joint module of claim 1, wherein the clutch mechanism, the motor, and the first transmission are arranged along and operable about the axis of rotation.

6. The clutched joint module of claim 1, wherein the motor comprises a brushless frameless electric motor.

7. The clutched joint module of claim 1, further comprising a quasi-passive elastic actuator coupled to the input member and arranged in parallel with the primary actuator, the quasi-passive elastic actuator operable to store and release energy upon the clutch mechanism being engaged or semi-engaged.

8. The clutched joint module of claim 7, wherein the quasi-passive elastic actuator operates to generate a braking force to at least partially restrict rotation between the input and output members.

9. The clutched joint module of claim 7, wherein the quasi-passive elastic actuator operates to apply an augmented torque to be combined with a primary torque generated by the primary actuator to assist in rotation of the output member.

10. The clutched joint module of claim 7, wherein the quasi-passive elastic actuator is selectively switchable in real-time between an elastic state, a semi-elastic state, and an inelastic state via the clutch mechanism.

11. The clutched joint module of claim 7, wherein the quasi-passive elastic actuator comprises a quasi-passive linear pneumatic actuator.

12. The clutched joint module of claim 11, wherein the quasi-passive linear pneumatic actuator is gas pressure charged to at least partially define a joint stiffness value of the clutched joint module.

13. The clutched joint module of claim 1, wherein the clutch mechanism comprises:

a clutch housing coupled to the input member;
a plurality of input plates retained by the clutch housing;
a plurality of output plates rotatably supported by the clutch housing and rotatably engaged with the plurality of input plates; and
an actuator operable to apply a compression force to the output plates and the input plates, upon receiving a clutch control signal, to cause the clutch mechanism to operate in the engaged state.

14. The clutched joint module of claim 13, wherein the output member is coupled to the plurality of output plates, such that, when the clutch mechanism is in the disengaged state, the output plates freely rotate relative to the input plates.

15. The clutched joint module of claim 13, wherein the first transmission is disposed at least partially within the motor, and wherein the clutched joint module further comprises a second transmission operatively coupled between the first transmission and the clutch mechanism.

16. The clutched joint module of claim 1, wherein the clutch mechanism comprises:

a clutch housing coupled to the input member;
a plurality of input plates retained by the clutch housing;
a plurality of output plates rotatably supported by the clutch housing and rotatably engaged with the plurality of input plates;
a ball-ramp clutch device coupled to the clutch housing; and
an actuator coupled to the ball-ramp clutch device and operable to rotate the ball-ramp clutch device, upon receiving a control signal, to apply a compression force to the output plates and the input plates to cause the clutched mechanism to operate in the engaged state.

17. The clutched joint module of claim 16, wherein the clutch mechanism further comprises an output shaft coupled to the plurality of output plates, such that, when the clutch mechanism is in the disengaged state, the output plates freely rotate relative to the input plates.

18. A robotic system comprising a robotic limb having at least one rotatable joint, the robotic assembly comprising:

a plurality of support members; and
a plurality of clutched joint modules defining respective joints of the robotic limb, each clutched joint module rotatably coupling together at least two of the plurality of support members, and comprising:
a joint rotatable about an axis of rotation and defining a degree of freedom;
a primary actuator operable to apply a primary torque to rotate the joint;
a clutch mechanism coupled to the primary actuator and operable between an engaged state, a semi-engaged state and a disengaged state, wherein the engaged state and the semi-engaged state facilitate selective application of the primary torque to rotate the joint, wherein the clutch mechanism and the primary actuator each have a central axis of rotation substantially parallel to each other; and
a quasi-passive elastic actuator operable with the clutch mechanism and arranged in parallel with the primary actuator, the quasi-passive elastic actuator operable to store and release energy upon the clutch mechanism being in one of an engaged state or a semi-engaged state.

19. The robotic system of claim 18, wherein the clutch mechanism is operable in the engaged or semi-engaged state to generate a braking force for restricting rotation of the joint either with or without the primary torque.

20. The robotic system of claim 18, wherein the quasi-passive elastic actuator operates to generate a braking force to at least partially restrict rotation between the input and output members.

21. The robotic system of claim 18, wherein the quasi-passive elastic actuator operates to apply an augmented torque to be combined with a primary torque generated by the primary actuator to assist in rotation of the joint.

22. The robotic system of claim 18, wherein the primary actuator comprises a motor and a transmission operatively coupled to the motor.

23. The robotic system of claim 22, wherein the clutch mechanism, the motor, and the transmission are arranged along and operable about the axis of rotation.

24. The robotic system of claim 23, wherein one of the plurality of clutched joint modules comprises a quasi-passive elastic actuator comprising an elastic element of a first type, and wherein another one of the plurality of clutched joint modules comprises a quasi-passive elastic actuator comprising an elastic element of a different type.

25. The robotic system of claim 23, wherein a quasi-passive elastic actuator is selectively switchable in real-time between an elastic state, a semi-elastic state, and an inelastic state via the clutch mechanism.

26. A clutched joint module for use within a robotic assembly, comprising:
an output member operable to couple to a first support member of a robotic system;
an input member operable to couple to a second support member of the robotic system;
a primary actuator operable to apply a primary torque to the output member to rotate the first and second support members relative to one another about an axis of rotation of the clutched joint module;
a quasi-passive elastic actuator coupled to the input member and operable to apply an augmented torque to the output member that combines with the primary torque applied by the primary actuator to rotate the output member about the axis of rotation; and
a clutch mechanism operably coupled to the primary actuator and the quasi-passive elastic actuator, the clutch mechanism operable in an engaged state, a semi-engaged state, or a disengaged state, wherein, in the engaged state, the clutch mechanism operates to place the quasi-passive elastic actuator in an elastic state, and to facilitate application of the augmented torque,
wherein the clutch mechanism and the primary actuator each have a central axis of rotation substantially parallel to each other.

27. The clutched joint module of claim 26, wherein the primary actuator and the output member are operatively coupled to each other by a transmission.

28. The clutched joint module of claim 26, wherein the primary actuator comprises an electric motor and a planetary drive transmission rotatably coupled to the electric motor, and wherein the planetary drive transmission is at least partially disposed within a central void of the electric motor.

29. The clutched joint module of claim 26, wherein the quasi-passive elastic actuator comprises a linear pneumatic actuator, and wherein the elastic component further comprises a piston rod and a piston cylinder moveable in a linear motion within a housing, the piston cylinder defining, at least in part, a compression chamber and an expansion chamber.

30. The clutched joint module of claim 29, wherein the linear pneumatic actuator comprises the input member, wherein the piston rod is pivotally coupled to a housing of the clutch mechanism at an off-center position, such that, upon the first rotation, movement of the input member causes the piston cylinder to move to compress gas in the compression chamber to selectively store energy.

31. The clutched joint module of claim 30, wherein, upon a second rotation, the linear pneumatic actuator releases energy via the piston rod to apply the augmented torque to the output member in parallel with the primary torque applied by the primary actuator.

32. The clutched joint module of claim 26, wherein the clutch mechanism comprises:
a clutch housing coupled to the input member;
a plurality of input plates retained by the clutch housing;
a plurality of output plates rotatably supported by the clutch housing and rotatably engaged with the plurality of input plates; and
an actuator operable to apply a compression force to the output plates and the input plates, upon receiving a clutch control signal, to cause the clutch mechanism to operate in the engaged state.

33. The clutched joint module of claim 32, wherein the output member is coupled to the plurality of output plates, such that, when the clutch mechanism is in the disengaged state, the output plates freely rotate relative to the input plates.

34. The clutched joint module of claim 26, wherein the clutch mechanism comprises:
a clutch housing coupled to the input member;
a plurality of input plates retained by the clutch housing;
a plurality of output plates rotatably supported by the clutch housing and rotatably engaged with the plurality of input plates;
a ball-ramp clutch device coupled to the clutch housing; and
an actuator coupled to the ball-ramp clutch device and operable to rotate the ball-ramp clutch device, upon receiving a control signal, to apply a compression force to the output plates and the input plates to cause the clutched mechanism to operate in the engaged state.

35. The clutched joint module of claim 34, wherein the clutch mechanism further comprises an output shaft coupled to the plurality of output plates, such that, when the clutch mechanism is in the disengaged state, the output plates freely rotate relative to the input plates, the output shaft being coupled to the output member.

36. A robotic system comprising a robotic limb having at least one rotatable joint, the robotic assembly comprising:
a plurality of support members; and
a plurality of clutched joint modules defining respective joints of the robotic limb, each clutched joint module rotatably coupling together at least two of the plurality of support members, and comprising:
a joint rotatable about an axis of rotation and defining a degree of freedom;
a primary actuator operable to apply a primary torque to rotate the joint, wherein the primary actuator comprises a motor and a transmission operatively coupled to the motor; and
a clutch mechanism coupled to the primary actuator and operable between an engaged state, a semi-engaged state and a disengaged state, wherein the engaged state and the semi-engaged state facilitate selective application of the primary torque to rotate the joint, wherein the clutch mechanism, the motor, and the transmission are arranged along and operable about the axis of rotation, and wherein one of the plurality of clutched joint modules comprises a quasi-passive elastic actuator comprising an elastic element of a first type, and wherein another one of the plurality of clutched joint modules comprises a quasi-passive elastic actuator comprising an elastic element of a different type.

37. A robotic system comprising a robotic limb having at least one rotatable joint, the robotic assembly comprising:
a plurality of support members; and
a plurality of clutched joint modules defining respective joints of the robotic limb, each clutched joint module rotatably coupling together at least two of the plurality of support members, and comprising:
a joint rotatable about an axis of rotation and defining a degree of freedom;
a primary actuator operable to apply a primary torque to rotate the joint, wherein the primary actuator comprises a motor and a transmission operatively coupled to the motor; and
a clutch mechanism coupled to the primary actuator and operable between an engaged state, a semi-engaged state and a disengaged state, wherein the engaged state and the semi-engaged state facilitate selective application of the primary torque to rotate the joint,
wherein the clutch mechanism, the motor, and the transmission are arranged along and operable about the axis of rotation, and
wherein the quasi-passive elastic actuator is selectively switchable in real-time between an elastic state, a semi-elastic state, and an inelastic state via the clutch mechanism.

38. A clutched joint module for use within a robotic assembly, comprising:
an output member operable to couple to a first support member of a robotic system;
an input member operable to couple to a second support member of the robotic system;
a primary actuator operable to apply a primary torque to the output member to rotate the first and second support members relative to one another about an axis of rotation of the clutched joint module, wherein the primary actuator comprises an electric motor having a central void, and a planetary drive transmission rotatably coupled to the electric motor, the planetary drive transmission being at least partially disposed within the central void of the electric motor;
a quasi-passive elastic actuator coupled to the input member and operable to apply an augmented torque to the output member that combines with the primary torque applied by the primary actuator to rotate the output member about the axis of rotation; and
a clutch mechanism operably coupled to the primary actuator and the quasi-passive elastic actuator, the clutch mechanism operable in an engaged state, a semi-engaged state, or a disengaged state, wherein, in the engaged state, the clutch mechanism operates to place the quasi-passive elastic actuator in an elastic state, and to facilitate application of the augmented torque.

39. A clutched joint module for use within a robotic assembly, comprising:
an output member operable to couple to a first support member of a robotic system;
an input member operable to couple to a second support member of the robotic system;
a primary actuator operable to apply a torque to rotate the output member about an axis of rotation;
a clutch mechanism operably coupled between the input member and the output member, the clutch mechanism operable in an engaged state, a semi-engaged state, or a disengaged state, wherein the engaged state and the semi-engaged state facilitate selective application of the primary torque to the output member, wherein the clutch mechanism and the primary actuator each have a central axis of rotation substantially parallel to each other; and
a quasi-passive elastic actuator coupled to the input member and arranged in parallel with the primary actuator, the quasi-passive elastic actuator operable to store and release energy upon the clutch mechanism being in one of the engaged state or the semi-engaged state.

40. A clutched joint module for use within a robotic assembly, comprising:
an output member operable to couple to a first support member of a robotic system;
an input member operable to couple to a second support member of the robotic system;
a primary actuator operable to apply a torque to rotate the output member about an axis of rotation, the primary actuator comprising a motor and a first transmission disposed at least partially within the motor;
a clutch mechanism operably coupled between the input member and the output member, the clutch mechanism operable in an engaged state, a semi-engaged state, or a disengaged state, wherein the engaged state and the semi-engaged state facilitate selective application of the primary torque to the output member, wherein the clutch mechanism and the primary actuator each have a central axis of rotation substantially parallel to each other, wherein the clutch mechanism comprises:
a clutch housing coupled to the input member;
a plurality of input plates retained by the clutch housing;
a plurality of output plates rotatably supported by the clutch housing and rotatably engaged with the plurality of input plates; and
an actuator operable to apply a compression force to the output plates and the input plates, upon receiving a clutch control signal, to cause the clutch mechanism to operate in the engaged state; and
a second transmission operatively coupled between the first transmission and the clutch mechanism.

41. A robotic system comprising a robotic limb having at least one rotatable joint, the robotic assembly comprising:
a plurality of support members; and
a plurality of clutched joint modules defining respective joints of the robotic limb, each clutched joint module rotatably coupling together at least two of the plurality of support members, and comprising:
a joint rotatable about an axis of rotation and defining a degree of freedom;
a primary actuator operable to apply a primary torque to rotate the respective joint, wherein the primary actuator comprises a motor and a transmission operatively coupled to the motor; and
a clutch mechanism coupled to the primary actuator and operable between an engaged state, a semi-engaged state and a disengaged state, wherein the engaged state and the semi-engaged state facilitate selective application of the primary torque to rotate the respective joint, wherein the clutch mechanism and the primary actuator each have a central axis of rotation substantially parallel to each other, and wherein the clutch mechanism, the motor, and the transmission are arranged along and operable about the respective axis of rotation; and a quasi-passive elastic actuator selectively switchable in real-time between an elastic state, a semi-elastic state, and an inelastic state via the clutch mechanism.

* * * * *